United States Patent
Doucette et al.

(10) Patent No.: US 11,803,329 B2
(45) Date of Patent: Oct. 31, 2023

(54) METHODS AND SYSTEMS FOR PROCESSING WRITE REQUESTS IN A STORAGE SYSTEM

(71) Applicant: NETAPP, INC., San Jose, CA (US)

(72) Inventors: Douglas P. Doucette, San Diego, CA (US); Sushilkumar Gangadharan, San Jose, CA (US); Rohit Singh, Cary, NC (US)

(73) Assignee: NETAPP, INC., San Jose, CA (US)

(*) Notice: Subject to any disclaimer, the term of this patent is extended or adjusted under 35 U.S.C. 154(b) by 32 days.

(21) Appl. No.: 17/456,012

(22) Filed: Nov. 22, 2021

(65) Prior Publication Data
US 2023/0161500 A1    May 25, 2023

(51) Int. Cl.
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0688* (2013.01); *G06F 12/0238* (2013.01); *G06F 2212/1016* (2013.01)

(58) Field of Classification Search
CPC .... G06F 3/0659; G06F 3/0613; G06F 3/0688; G06F 12/0238; G06F 2212/1016
See application file for complete search history.

(56) References Cited

U.S. PATENT DOCUMENTS

| | | |
|---|---|---|
| 5,664,187 A | 9/1997 | Burkes et al. |
| 6,101,615 A | 8/2000 | Lyons |
| 8,074,021 B1 | 12/2011 | Miller et al. |
| 8,463,991 B2 | 6/2013 | Colgrove et al. |
| 8,549,222 B1 | 10/2013 | Kleiman et al. |
| 8,775,868 B2 | 7/2014 | Colgrove et al. |
| 8,832,373 B2 | 9/2014 | Colgrove et al. |
| 8,850,108 B1 | 9/2014 | Hayes et al. |

(Continued)

FOREIGN PATENT DOCUMENTS

EP    1343087 A2    9/2003

OTHER PUBLICATIONS

International Search Report and Written Opinion, International Patent Application No. PCT/US2022/049431, dated Mar. 3, 2023, 13 pgs.

(Continued)

*Primary Examiner* — Michelle T Bechtold
(74) *Attorney, Agent, or Firm* — LOZA & LOZA, LLP; Tejinder Singh

(57) ABSTRACT

Methods and systems for a storage environment are provided, including generating a plurality of child (or tetris) write requests to write data for a write request using a plurality of subdivisions of a plurality of logical zones defined for a plurality of zoned solid state drives (ZNS SSDs) of a RAID array, each LZone mapped to one or more logical RAID zone (RZone) of the ZNS SSDs having a plurality of physical zones across a plurality of independent media units of each ZNS SSD; assigning a sequence number to each child (or tetris) write request corresponding to each subdivision, the sequence number indicating an order in which the child (or tetris) write requests are to be processed; and selecting, based on the assigned sequence number, one or more subdivisions for sequentially writing data to one or more RZones of the plurality of ZNS SSDs.

20 Claims, 17 Drawing Sheets

(56) References Cited

U.S. PATENT DOCUMENTS

| | | | |
|---|---|---|---|
| 8,862,820 | B2 | 10/2014 | Colgrove et al. |
| 9,003,144 | B1 | 4/2015 | Hayes et al. |
| 9,021,297 | B1 | 4/2015 | Hayes et al. |
| 9,134,917 | B2 | 9/2015 | Kimmel et al. |
| 9,201,600 | B1 | 12/2015 | Hayes et al. |
| 9,218,244 | B1 | 12/2015 | Hayes et al. |
| 9,229,808 | B2 | 1/2016 | Colgrove et al. |
| 9,244,769 | B2 | 1/2016 | Colgrove et al. |
| 9,367,243 | B1 | 6/2016 | Hayes et al. |
| 9,483,346 | B2 | 11/2016 | Davis et al. |
| 9,495,255 | B2 | 11/2016 | Davis et al. |
| 9,525,738 | B2 | 12/2016 | Hayes et al. |
| 9,563,506 | B2 | 2/2017 | Hayes et al. |
| 9,588,842 | B1 | 3/2017 | Sanvido et al. |
| 9,594,633 | B2 | 3/2017 | Colgrove et al. |
| 9,672,125 | B2 | 6/2017 | Botes et al. |
| 9,672,905 | B1 | 6/2017 | Gold et al. |
| 9,798,477 | B2 | 10/2017 | Botes et al. |
| 9,880,899 | B2 | 1/2018 | Davis et al. |
| 9,934,089 | B2 | 4/2018 | Hayes et al. |
| 9,967,342 | B2 | 5/2018 | Colgrove et al. |
| 10,095,701 | B1 | 10/2018 | Faibish et al. |
| 10,180,879 | B1 | 1/2019 | Colgrove et al. |
| 10,248,516 | B1 | 4/2019 | Sanvido et al. |
| 10,303,547 | B2 | 5/2019 | Hayes et al. |
| 10,353,777 | B2 | 7/2019 | Bemat et al. |
| 10,372,506 | B2 | 8/2019 | Baptist et al. |
| 10,379,763 | B2 | 8/2019 | Colgrove et al. |
| 10,387,247 | B2 | 8/2019 | Baptist et al. |
| 10,387,250 | B2 | 8/2019 | Resch et al. |
| 10,387,256 | B2 | 8/2019 | Dhuse et al. |
| 10,402,266 | B1 | 9/2019 | Kirkpatrick et al. |
| 10,417,092 | B2 | 9/2019 | Brennan et al. |
| 10,432,233 | B1 | 10/2019 | Colgrove et al. |
| 10,437,673 | B2 | 10/2019 | Baptist et al. |
| 10,437,678 | B2 | 10/2019 | Resch |
| 10,452,289 | B1 | 10/2019 | Colgrove et al. |
| 10,467,107 | B1 | 11/2019 | Abrol et al. |
| 10,489,256 | B2 | 11/2019 | Hayes et al. |
| 10,503,598 | B2 | 12/2019 | Trichardt et al. |
| 10,521,120 | B1 | 12/2019 | Miller et al. |
| 10,530,862 | B2 | 1/2020 | Isely et al. |
| 10,534,661 | B2 | 1/2020 | Resch |
| 10,572,176 | B2 | 2/2020 | Davis et al. |
| 10,579,450 | B2 | 3/2020 | Khadiwala et al. |
| 10,606,700 | B2 | 3/2020 | Alnafoosi et al. |
| 10,613,974 | B2 | 4/2020 | Dreier et al. |
| 10,656,871 | B2 | 5/2020 | Peake |
| 10,657,000 | B2 | 5/2020 | Resch |
| 10,671,480 | B2 | 6/2020 | Hayes et al. |
| RE48,222 | E | 9/2020 | Colgrove et al. |
| 10,776,204 | B2 | 9/2020 | Resch et al. |
| 10,810,083 | B1 | 10/2020 | Colgrove et al. |
| 10,817,375 | B2 | 10/2020 | Colgrove et al. |
| 10,838,834 | B1 | 11/2020 | Sanvido et al. |
| 10,860,424 | B1 | 12/2020 | Dhuse et al. |
| 10,891,192 | B1 | 1/2021 | Brennan et al. |
| RE48,448 | E | 2/2021 | Colgrove et al. |
| 11,269,778 | B1* | 3/2022 | Kanteti ............... G06F 12/0862 |
| 11,340,987 | B1 | 5/2022 | Gole et al. |
| 11,442,646 | B2 | 9/2022 | Agarwal |
| 11,698,836 | B2 | 7/2023 | Gole et al. |
| 2006/0129873 | A1 | 6/2006 | Hafner et al. |
| 2006/0242539 | A1 | 10/2006 | Kang et al. |
| 2010/0332401 | A1 | 12/2010 | Prahlad et al. |
| 2012/0084506 | A1 | 4/2012 | Colgrove et al. |
| 2012/0151118 | A1 | 6/2012 | Flynn et al. |
| 2014/0281227 | A1 | 9/2014 | Herron et al. |
| 2015/0169244 | A1* | 6/2015 | Asnaashari ........... G06F 3/0659 |
| | | | 711/103 |
| 2015/0199151 | A1 | 7/2015 | Klemm et al. |
| 2016/0313943 | A1 | 10/2016 | Hashimoto et al. |
| 2016/0342470 | A1 | 11/2016 | Cudak et al. |
| 2017/0124345 | A1 | 5/2017 | Christiansen et al. |
| 2017/0220264 | A1 | 8/2017 | Sokolov et al. |
| 2019/0004964 | A1 | 1/2019 | Kanno |
| 2019/0018788 | A1 | 1/2019 | Yoshida et al. |
| 2019/0278663 | A1 | 9/2019 | Mehta et al. |
| 2020/0089407 | A1 | 3/2020 | Baca et al. |
| 2020/0394112 | A1 | 12/2020 | Gupta et al. |
| 2020/0409589 | A1 | 12/2020 | Bennett et al. |
| 2020/0409601 | A1 | 12/2020 | Hielmick et al. |
| 2021/0081273 | A1 | 3/2021 | Helmick et al. |
| 2021/0081330 | A1* | 3/2021 | Bennett ................ G06F 3/0679 |
| 2021/0132827 | A1 | 5/2021 | Helmick et al. |
| 2021/0303188 | A1 | 9/2021 | Bazarsky et al. |
| 2021/0334006 | A1 | 10/2021 | Singh et al. |
| 2022/0027051 | A1 | 1/2022 | Kant et al. |
| 2022/0137844 | A1* | 5/2022 | Goss .................... G06F 3/0634 |
| | | | 711/154 |
| 2022/0197553 | A1 | 6/2022 | Benhanokh et al. |
| 2022/0229596 | A1* | 7/2022 | Jung ..................... G06F 3/061 |
| 2022/0244869 | A1* | 8/2022 | Kanteti ................ G06F 3/0631 |
| 2022/0283900 | A1 | 9/2022 | Gole et al. |
| 2022/0291838 | A1 | 9/2022 | Gorobets et al. |
| 2023/0082636 | A1 | 3/2023 | Zhu et al. |
| 2023/0107466 | A1 | 4/2023 | Gole |

OTHER PUBLICATIONS

Non-Final Office Action dated Mar. 30, 2023 for U.S. Appl. No. 17/494,684, filed Oct. 5, 2021, 8 pages.

Notice of Allowance on co-pending (U.S. Appl. No. 17/192,606) dated Jan. 28, 2022.

Dholakia et al.; "A New Intra-disk Redundancy Scheme for High-Reliability RAID Storage Systems in the Presence of Unrecoverable Errors"; ACM Transactions on Storage, vol. 4, No. 1, Article 1; May 2008; 42 pages.

NetApp, Inc.; "V-Series Systems Hardware Maintenance Guide"; Jul. 2006; Part No. 210-00975_A0; 202 pages.

NetApp, Inc.; "Date ONTAP® 7.3 Core Commands Quick Reference"; Jun. 2008; Part No. 215-03893_A0; 1 page.

NetApp, Inc.; "Data ONTAP® 7.3 Documentation Roadmap"; Jul. 9, 2008; Part No. 210-04229_A0; 8 pages.

NetApp, Inc.; "Data ONTAP® 7.3 File Access and Protocols Management Guide"; Sep. 10, 2009; Part No. 210-04505_B0; 382 pages.

NetApp, Inc.; "V-Series Systems Implementation Guide for Hitachi® Storage"; Dec. 2009; Part No. 210-04694_A0; 66 pages.

NetApp, Inc.; "V-Series Systems MetroCluster Guide"; Jul. 2009; Part No. 210-04515_A0; 80 pages.

NetApp, Inc.; "Data ONTAP® 7.3 Archive and Compliance Management Guide"; Mar. 4, 2010; Part No. 210-04827_A0; 180 pages.

NetApp, Inc.; "Data ONTAP® 7.3 Block Access Management Guide for iSCSI and FC"; Mar. 4, 2010; Part No. 210-04752_B0; 202 pages.

NetApp, Inc.; "Data ONTAP® 7.3 Data Protection Tape Backup and Recovery Guide"; Jan. 15, 2010; Part No. 210-04762_A0; 142 pages.

NetApp, Inc.; "Data ONTAP® 7.3 MultiStore Management Guide"; Mar. 4, 2010; Part No. 210-04855_A0; 144 pages.

NetApp, Inc.; "Data ONTAP® 7.3 Network Management Guide"; Jan. 15, 2010; Part No. 210-04757_A0; 222 pages.

NetApp, Inc.; "Data ONTAP® 7.3 Software Setup Guide"; Nov. 4, 2010; Part No. 210-05045_A0; 116 pages.

NetApp, Inc.; "Data ONTAP® 7.3 Storage Efficiency Management Guide"; Mar. 4, 2010; Part No. 210-04856_A0; 76 pages.

NetApp, Inc.; "Data ONTAP® 7.3 System Administration Guide"; Nov. 11, 2010; Part No. 210-05043_A0; 350 pages.

NetApp, Inc.; "Data ONTAP® 7.3 Upgrade Guide"; Nov. 11, 2010; Part No. 210-05042_A0; 200 pages.

NetApp, Inc.; "Notices"; 2010; Part No. 215-05705_A0; 46 pages.

NetApp, Inc.; "V-Series Systems Installation Requirements and Reference Guide"; Oct. 2010; Part No. 210-05064_A0; 214 pages.

NetApp, Inc.; "Data ONTAP® 7.3 Active/Active Configuration Guide"; Jun. 16, 2011; Part No. 210-05247_A0; 214 pages.

NetApp, Inc.; "Data ONTAP® 7.3 Data Protection Online Backup and Recovery Guide"; Feb. 22, 2011; Part No. 210-05212_A0; 432 pages.

(56) References Cited

OTHER PUBLICATIONS

NetApp, Inc.; "Data ONTAP® 7.3.7 Release Notes"; May 31, 2012; Part No. 215-06916_A0; 182 pages.
NetApp, Inc.; "Data ONTAP® 7.3 Storage Management Guide"; May 3, 2012; Part No. 210-04766_B0; 356 pages.
Bo Mao et al.; "HPDA: A Hybrid Parity-Based Disk Array for Enhanced Performance and Reliability"; May 2020; 13 pages; https://www.researchgate.net/publication/224140602.
"NVM Express Base Specification"; Mar. 9, 2020; Revision 1.4a; NVM Express Workgroup; 405 pages.
International Preliminary Report on Patentability for Application No. PCT/US2021/028879, dated Oct. 25, 2022, 6 pages.
International Search Report and Written Opinion for International Application No. PCT/US2021/028879, dated Aug. 5, 2021, 8 pages.
Mao, B., et al., "HPDA: A Hybrid Parity-Based Disk Array for Enhanced Performance and reliability," ACM Transactions on Storage (TOS), vol. 8, No. 1, Publication [online], Feb. 2012 [retrieved Apr. 4, 2016). Retrieved from the Internet: URL: http://or.nsfc.gov.cn/bitstream/00001903-5/90177/1/1000003549834.pdf , 20 pages.
Notice of Allowance on co-pending (U.S. Appl. No. 17/727,511) dated Dec. 14, 2022.
Notice of Allowance on co-pending (U.S. Appl. No. 16/858,019) dated Dec. 20, 2022.
European Search Report for Application No. EP22157793 dated Jul. 19, 2022, 16 pages.
Non-Final Office Action on co-pending (U.S. Appl. No. 17/650,940) dated Feb. 16, 2023.
Notice of Allowance dated Jun. 16, 2023 for U.S. Appl. No. 16/858,019, filed Apr. 24, 2020, 10 pages.
Notice of Allowance dated Jun. 26, 2023 for U.S. Appl. No. 17/494,684, filed Oct. 5, 2021, 8 pages.
Non-Final Office Action dated May 15, 2023 for U.S. Appl. No. 17/650,936, filed Feb. 14, 2022, 19 pages.
Notice of Allowance dated Mar. 1, 2023 for U.S. Appl. No. 17/727,511, filed Apr. 22, 2022, 15 pages.
Notice of Allowance dated Jul. 19, 2023 for U.S. Appl. No. 17/650,940, filed Feb. 14, 2022, 9 pages.

* cited by examiner

METHODS AND SYSTEMS FOR PROCESSING WRITE REQUESTS IN A STORAGE SYSTEM

TECHNICAL FIELD

The present disclosure relates to storage systems and more particularly, to write request processing in a RAID (redundant array of independent (or inexpensive) disks) group having zoned namespace solid-state drives.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in a group of a storage sub-system. The storage devices (may also be referred to as "disks") within a storage system are typically organized as one or more groups (or arrays), wherein each group is operated as a RAID.

Zoned namespace solid state drives (ZNS SSDs) can now be used in RAID configurations to store data. In a ZNS SSD environment, data has to be sequentially written in a virtual zone that includes a plurality of RAID zones of the ZNS SSD. To write data to the ZNS SSDs, a file system sends write requests to a lower software layer to write data. The lower software layer may receive the write requests out of order and may not be able to efficiently process the received write requests sequentially. Continuous efforts are being made to develop technology for processing write requests in a RAID group having a plurality of ZNS SSDs.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
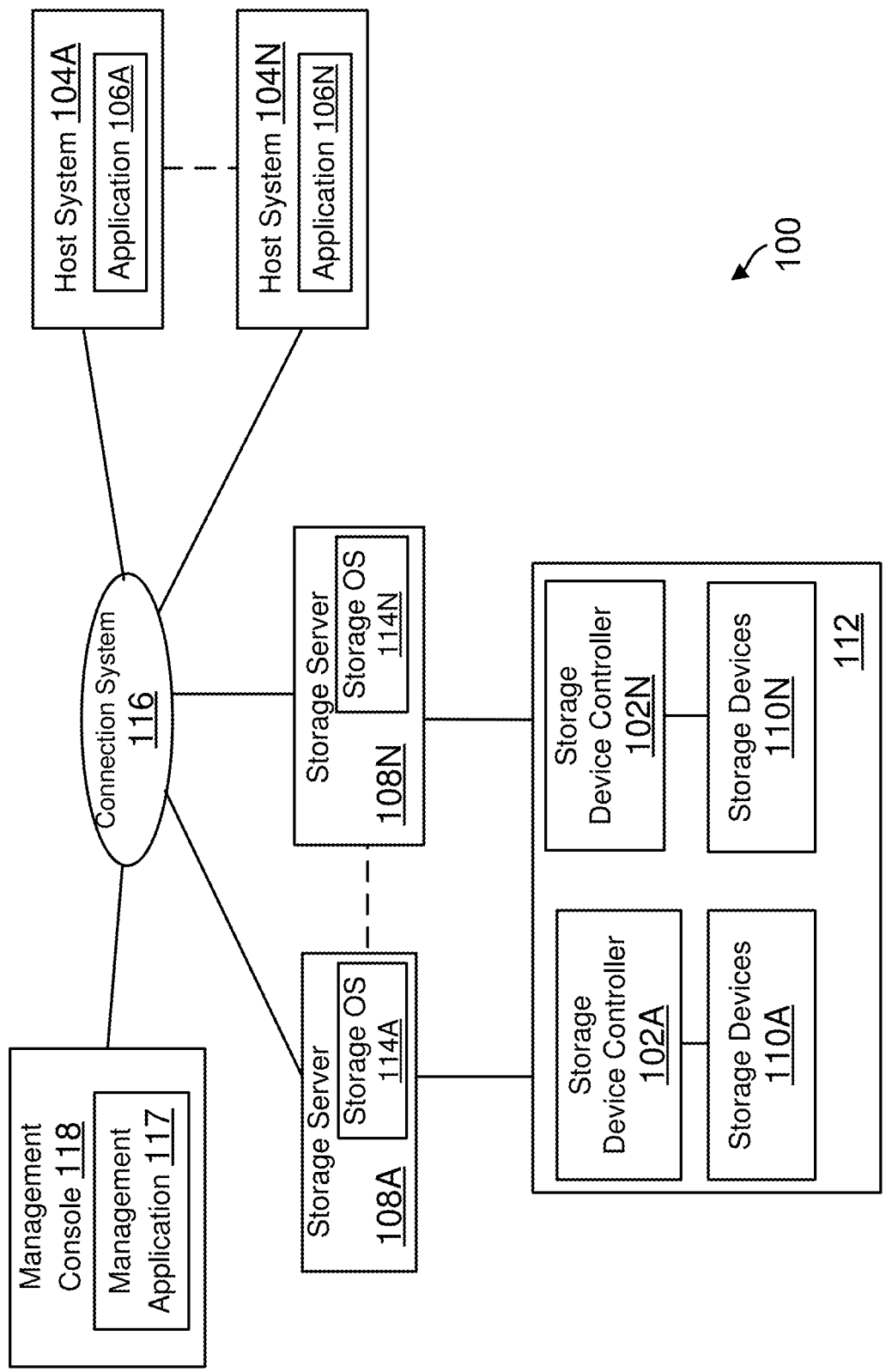
FIG. 1A shows an example of an operating environment for the various aspects disclosed herein.

In one aspect, innovative technology is disclosed for zoned namespace solid state drives ("ZNS SSDs") configured to operate in a RAID group. A ZNS SSD has individual media units ("MUs") that operate independent of each other to store information. Storage space at each ZNS SSD is exposed as zones. The zones are configured using independent MUs, which enable the MUs to operate as individual parts/portions of the RAID group. A first tier RAID layer configures the storage space of ZNS SSDs into physical zones ("PZones") spread uniformly across the MUs. Each MU is configured to include a plurality of PZones.

The first tier RAID layer also configures a plurality of RAID zones ("RZones"), each RZone assigned to a plurality of PZones. The RZones are presented by a zone translation layer (ZTL) to other software layers, e.g., a tier 2 RAID layer that interfaces with a file system manager (may also be referred to as a file system) to process read and write requests.

To read and write data, the file system manager is presented with a logical zone ("LZone") that maps to one or more RZones. The term LZone and RZone can be used interchangeably throughout this specification. LZones across a plurality of ZNS SSDs form a write allocation area for the file system manager. Each LZone is defined by a range of logical block addresses. The allocation area is further divided into smaller chunks that may be referred to as subdivisions, RAID subdivisions or tetris, throughout this specification and described below in detail. At a high level, a tetris includes a collection of block numbers (e.g., disk block numbers (DBNs)) across ZNS SSDs that can be multiple pages deep or of any configurable size. The file system manager is aware of free and used blocks within each LZone/tetris. Per ZNS standards, as described below in detail, data at the RZones is to be written sequentially by the ZTL and the first tier RAID layer.

To write data, the file system manager determines the number of blocks it will need to process an input/output ("I/O") request (also referred to as a write request), and accordingly allocates free blocks within a LZone, where the free blocks may be unevenly distributed within the LZone. The file system manager sends requests to the ZTL for each tetris (may also be referred to as a "tetris write request") with block numbers across the plurality of ZNS SSDs of a RAID group. Each tetris write request also includes a skip mask indicating the blocks that are already written within each tetris. The file system manager also assigns a sequence number to each tetris write request that is sent to the ZTL. The tetris write requests from the file system manager may reach the ZTL in any order and hence may be out of order. This presents a challenge for the ZTL to meet the ZNS sequential processing standard requirements.

To sequentially write data, ZTL maintains a counter to track the sequence number of each tetris write request received from the file system manager. Hence, ZTL is aware of an expected sequence number of each tetris write request. When a tetris write request includes an expected sequence number it is immediately processed. When the tetris write request is out of sequence, it is queued for processing after a tetris write request is received with the expected sequence number. This enables sequential processing of write requests by the ZTL, even if the tetris write requests are received out of order. The innovative technology disclosed herein improves computing technology of storage systems to sequentially process tetris write requests. Details regarding the innovative technology are provided below.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked operating environment 100 (also referred to as system 100) used according to one aspect of the present disclosure. As an example, system 100 may include a plurality of storage servers 108A-108N (may also be referred to as storage server/storage servers/storage controller/storage controllers 108) executing a storage operating system 114A-114N (may also be referred to as storage operating system 114 or storage operating systems 114), a plurality of computing systems 104A-104N (may also be referred to as server system/server systems 104 or as host system/host systems 104) that may access storage space provided by a storage-subsystem 112 managed by the storage servers 108 via a connection system 116 such as a local area network (LAN), wide area network (WAN), the Internet and others. The storage-subsystem 112 includes a plurality of storage devices 110A-110N (may also be referred to as storage device/storage devices/disk/disks 110) described below in detail. In one aspect, storage devices 110 are ZNS SSDs and are referred to as ZNS SSD 110 or ZNS SSDs 110. It is noteworthy that the term "disk" as used herein including the drawings is intended to mean any storage device/space and not intended to limit the adaptive aspects to any particular type of storage device, for example, hard disks or hard drives.

The server systems 104 may communicate with each other via connection system 116, for example, for working collectively to provide data-access service to user consoles (not shown). Server systems 104 may be computing devices configured to execute applications 106A-106N (may be referred to as application or applications 106) over a variety of operating systems, including the UNIX® and Microsoft Windows® operating systems (without derogation of any third-party rights). Application 106 may include an email exchange application, a database application or any other type of application. In another aspect, application 106 may comprise a virtual machine. Applications 106 may utilize storage devices 110 to store and access data.

Server systems 104 generally utilize file-based access protocols when accessing information (in the form of files and directories) over a network attached storage (NAS)-based network. Alternatively, server systems 104 may use block-based access protocols, for example but not limited to, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment, according to one aspect. In the virtual machine environment, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, the storage servers 108 use the storage operating system 114 to store and retrieve data from the storage sub-system 112 by accessing the ZNS SSDs 110 via storage device controllers 102A-102N (may also be referred to as disk controller/disk controllers 110). Data is stored and accessed using read and write requests that are also referred to as input/output (I/O) requests.

As an example, in addition to or in lieu of ZNS SSDs, the storage devices 110 may include writable storage device media such as magnetic disks, video tape, optical, DVD, magnetic tape, non-volatile memory devices for example, self-encrypting drives, flash memory devices, and any other similar media adapted to store information. The storage devices 110 may be organized as one or more RAID groups. The various aspects disclosed herein are not limited to any storage device type or storage device configuration.

In one aspect, ZNS SSDs 110 comply with the NVMe (Non-Volatile Memory Host Controller Interface) zoned namespace (ZNS) specification defined by the NVM Express™ (NVMe™) standard organization. An SSD "zone" as defined by the NVMe ZNS standard is a sequence of blocks that can only be written in a sequential fashion and are overwritten by performing a "Zone Erase" or "Zone Reset operation" per the NVMe specification. As mentioned above, ZNS SSD storage space is exposed as zones. Because SSD zones have to be written sequentially, it is challenging to process write requests that are received out of order without impacting the overall performance of processing write requests, as described below in detail.

MUs of a ZNS SSD operate independent of each other to store information and are managed by the storage device controller 102. The zones (or PZones) are configured using the independent MUs, which enables the MUs to operate as individual parts of a RAID group. This enables the storage sub-system 112 to use a single parity ZNS SSD to store parity data and distribute the parity data within each ZNS SSD of a RAID group, as described below in detail.

In one aspect, to facilitate access to ZNS SSDs 110, the storage operating system 114 "virtualizes" the storage space provided by ZNS SSDs 110. The storage server 108 can present or export data stored at ZNS SSDs 110 to server systems 104 as a storage volume or one or more qtree sub-volume units. Each storage volume may be configured to store data files (or data containers or data objects), scripts, word processing documents, executable programs, and any other type of structured or unstructured data. From the perspective of the server systems, each volume can appear to be a single drive. However, each volume can represent the storage space in one storage device, an aggregate of some or all the storage space in multiple storage devices, a RAID group, or any other suitable set of storage space.

The storage server 108 may be used to access information to and from ZNS SSDs 110 based on a request generated by server system 104, a management console (or system) 118 or any other entity. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 transmits one or more input/output (I/O) commands, such as an NFS or CIFS request, over connection system 116 to the storage server 108. The storage operating system 114 generates operations to load (retrieve) the requested data from ZNS 110 if it is not resident "in-core," i.e., at the memory of the storage server 108. If the information is not in the memory, the storage operating system retrieves a logical volume block number (VBN) that is mapped to a disk identifier and disk block number (Disk, DBN). The DBN is accessed from a ZNS SSD by the storage device controller 102 and loaded in memory for processing by the storage server 108. Storage server 108 then issues an NFS or CIFS response containing the requested data over the connection system 116 to the respective server system 104.

In one aspect, storage server 108 may have a distributed architecture, for example, a cluster-based system that may include a separate network module and storage module. Briefly, the network module is used to communicate with host platform server system 104 and management console 118, while the storage module is used to communicate with the storage subsystem 112.

The management console 118 executes a management application 117 that is used for managing and configuring various elements of system 100. Management console 118 may include one or more computing systems for managing and configuring the various elements.

Before describing the details of the present disclosure, a brief overview of parity protection in a RAID configuration will be helpful. A parity value for data stored in storage subsystem 112 can be computed by summing (usually modulo 2) data of a particular word size (usually one bit) across a number of similar ZNS SSD holding different data and then storing the results in a parity ZNS SSD. That is, parity may be computed on vectors 1-bit wide, composed of bits in corresponding positions on each ZNS SSD. When computed on vectors 1-bit wide, the parity can be either the computed sum or its complement; these are referred to as even and odd parity, respectively. Addition and subtraction on 1-bit vectors are both equivalent to exclusive-OR (XOR) logical operations. The data is protected against the loss of any one of the ZNS SSDs, or of any portion of the data on any one of the SSDs. If the ZNS SSD storing the parity is lost, the parity can be regenerated from the data or from parity data stored within each ZNS SSD. If one of the ZNS SSD is lost, the data can be regenerated by adding the contents of the surviving ZNS SSDs together and then subtracting the result from the stored parity data.

Typically, storage devices in a RAID configuration are divided into parity groups, each of which comprises one or more data drives and one or more parity drives. A parity set is a set of blocks, including several data blocks and one parity block, where the parity block is the XOR of all the data blocks. A parity group is a set of drives from which one or more parity sets are selected. The storage space is divided into stripes, with each stripe containing one block from each drive. The blocks of a stripe are usually at the same locations on each drive in the parity group. Within a stripe, all but one block are blocks containing data ("data blocks") and one block is a block containing parity ("parity block") computed by the XOR of all the data.

Figure 1B:
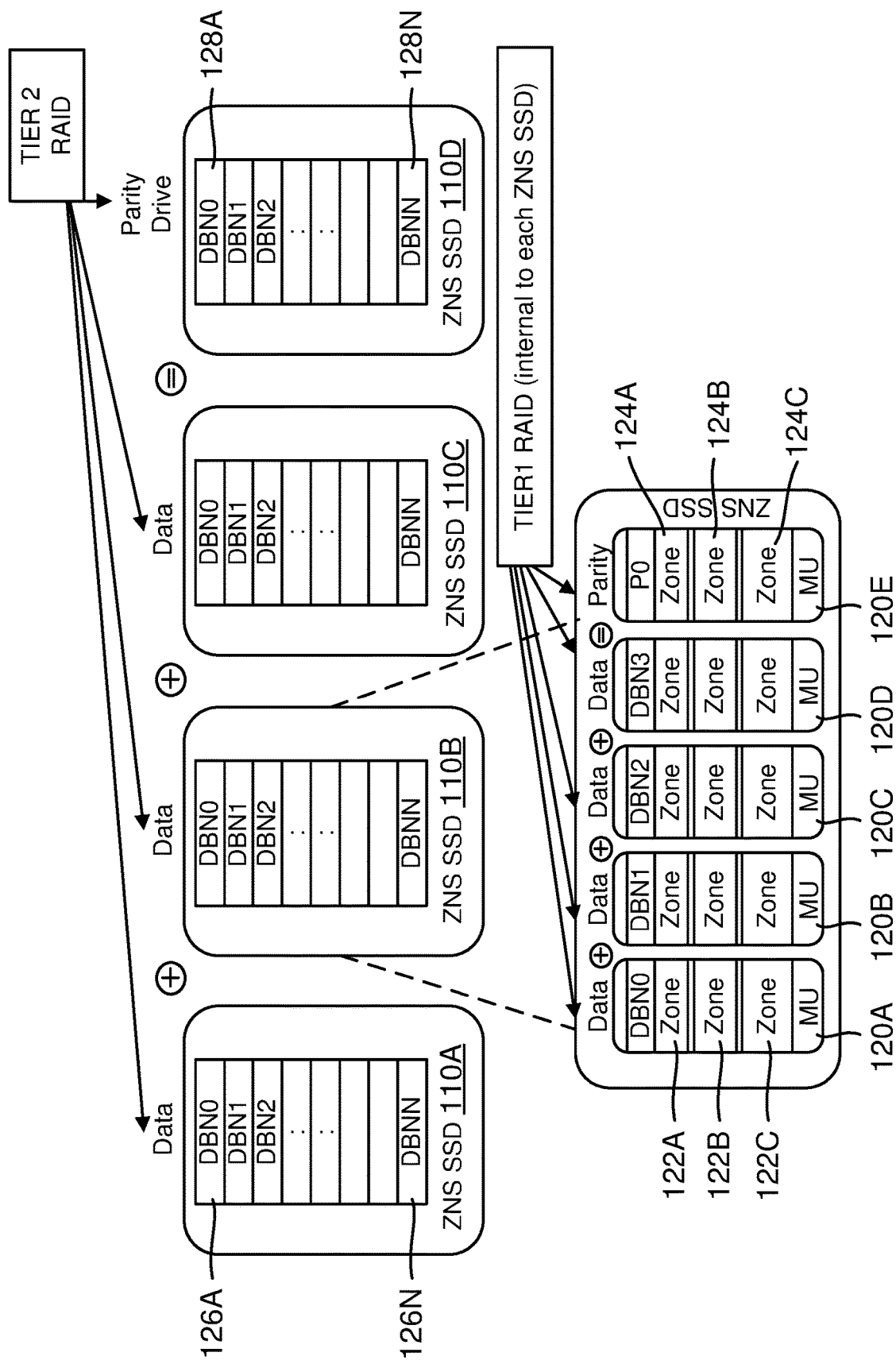
FIG. 1B shows a configuration of ZNS (Zone Namespace) SSDs (solid state drives), according to one aspect of the present disclosure.

ZNS SSD RAID Configuration: FIG. 1B illustrates a Hierarchical RAID implementation providing dual parity protection using a single, ZNS SSD 110D as a parity drive to store parity data, and ZNS SSDs 110A-110C as data drives storing data. Unlike conventional systems that use two parity drives within a RAID group for providing RAID 6 and RAID-DP type protection, only one parity drive 110D is used.

Each ZNS SSD 110A-110D include a plurality of storage blocks identified by disk block numbers ("DBNs"), shown as DBN0-DBNN (e.g., 126A-126N for ZNS SSD 110A). The parity drive ZNS SSD 110D has similar DBNs shown as 128A-128N for storing parity data. The parity data is computed by XORing data stored at disk blocks in a horizontal stripe with the same DBN of each ZNS SSD data drive (i.e., 110A-110C). The computed parity is written to the same DBN on the parity drive 110D. For example, the parity for data stored at the first disk (DBN0) of each ZNS SSD 110A-110C is stored at the DBNO 128A of ZNS SSD 110D. This is referred to as TIER2 RAID for providing RAID protection if a ZNS SSD fails or if a block of a ZNS SSD fails.

Parity is also computed and stored at each ZNS SSD, which is referred to as TIER1 RAID. An example of TIER1 RAID is shown for ZNS SSD 110B that includes a plurality of MUs 120A-120E. A plurality of zones is configured for the MUs 120A-120E, e.g., zones 122A-122C are based on MU 120A, while parity zones 124A-124C are based on MU 120E to store parity data. The zones within each ZNS SSD are spread uniformly across the MUs. Parity data for TIER1 RAID is computed across zones and stored at the parity zones 124A-124C within MU 120E. By grouping zones from independent MUs into a RAID stripe, TIER1 RAID can provide data availability even if a block from one of the zones encounters an uncorrectable read error or an entire MU is inaccessible.

Figure 1C:
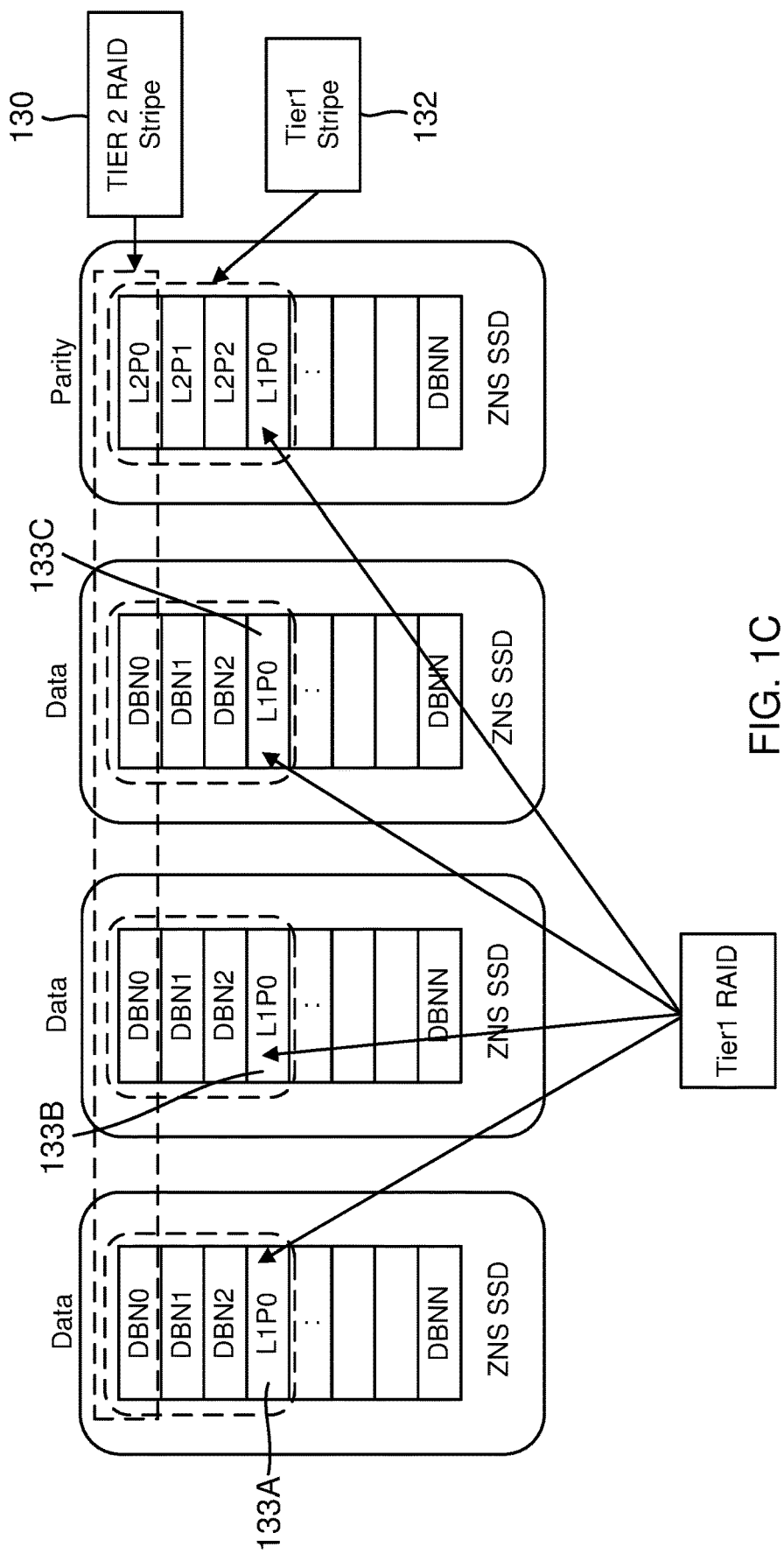
FIG. 1C provides another example of the ZNS SSD configuration, according to one aspect of the present disclosure.

FIG. 1C illustrates another representation of a dual parity architecture having a single ZNS SSD 110D within a RAID group to store parity data and storing parity data at each ZNS SSD of the RAID group. A horizontal TIER2 RAID stripe is shown within the rectangle 130 and the vertical TIER1 RAID stripe is shown within 132. The vertical TIER1 RAID parity is also shown as L1P0 (133A-133C) in ZNS SSDs 110A-110C and written to disk blocks that are internal to each ZNS SSD, i.e., these hidden disk blocks are not visible to upper software layers (such as TIER2 RAID layer 136 and file system manager 134 shown in FIG. 1D, and described below in detail).

Figure 1D:
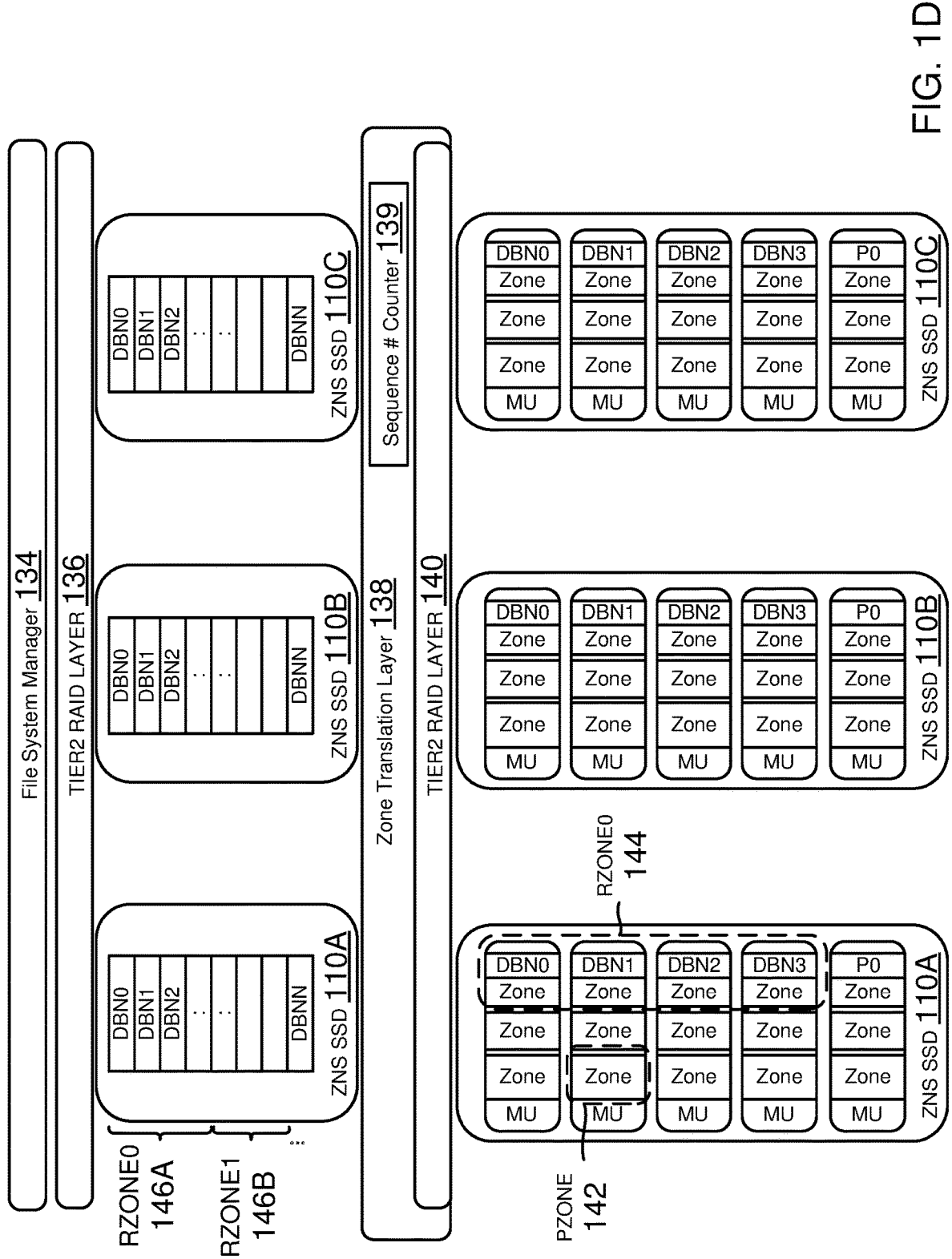
FIG. 1D shows an example architecture for using ZNS SSDs, according to one aspect of the present disclosure.

Software Architecture: FIG. 1D shows an example of the innovative software architecture used for implementing the innovative technology of the present disclosure. The architecture includes the file system manager 134 within the storage operating system 114, described in detail below with respect to FIG. 3. The TIER2 RAID layer 136 interfaces with the file system manager 134 for processing I/O requests to read and write data. A ZTL 138 with a TIER1 RAID layer 140 operates below the TIER2 RAID layer 136 for managing the zones of the ZNS SSDs 110A-110D. In one aspect, ZTL 138 also maintains a counter 139 for selecting tetris write requests to sequentially write data, as described below in detail.

As an example, the total storage capacity of each ZNS SSD is split across PZones, e.g., 142 for ZNS SSD 110A visible only to the TIER1 RAID layer 140. The PZones are grouped by MUs and each MU may contain a plurality of PZones. The TIER1 RAID layer 140 groups PZones across multiple MUs into RZones, e.g., RZone 0 146 for ZNS SSD 110A. The RZones may also be referred to as virtual zones (or VZones). After the TIER1 RAID layer 140 creates the RZones, the ZTL 138 and upper layers can view each ZNS SSD as a collection of RZones e.g., RZone 0 146A and RZone1 146B shown for ZNS SSD 110A.

Figure 1E:
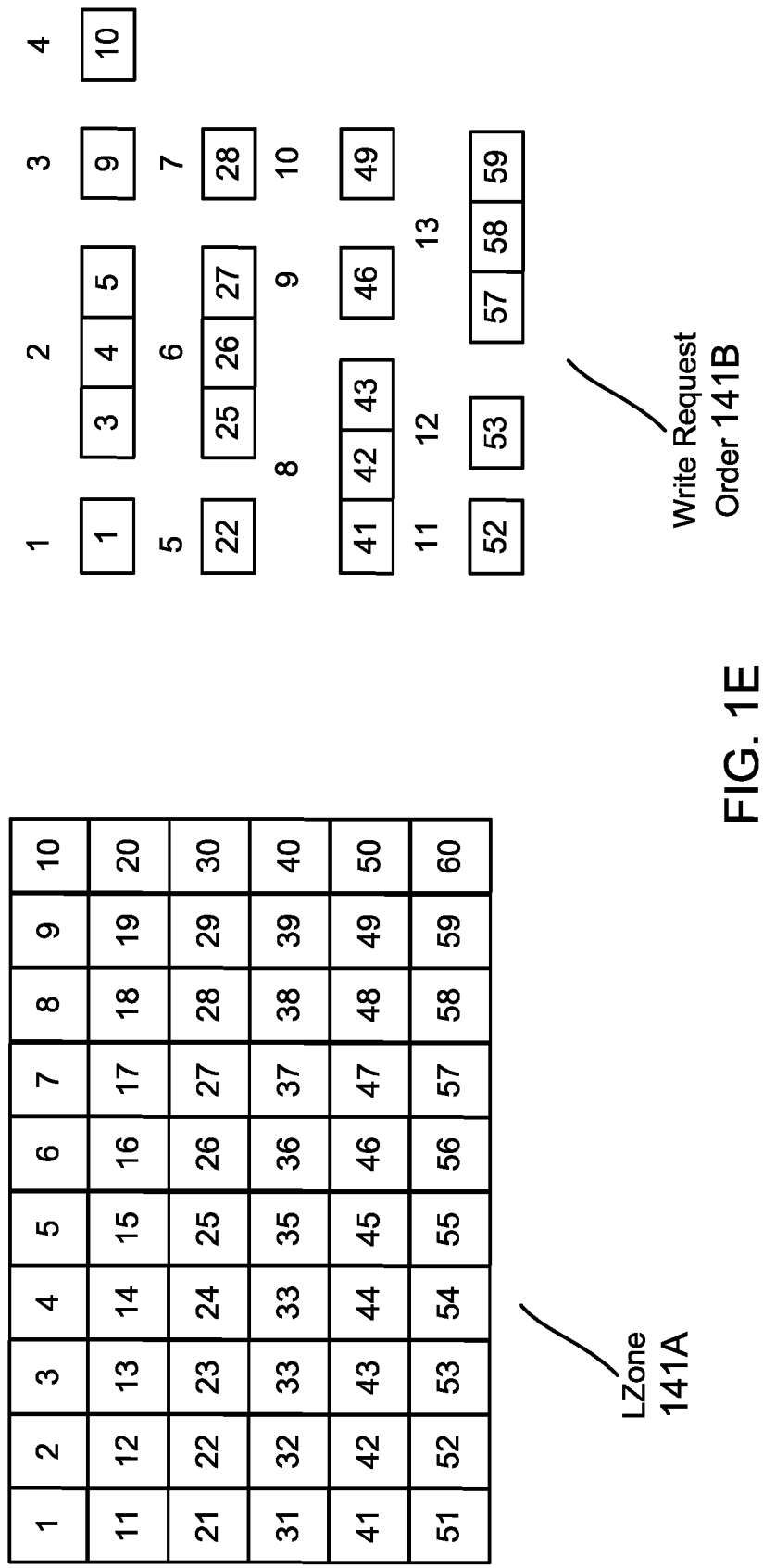
FIG. 1E shows an example of a logical zone (LZone) with available and unavailable blocks, used according to one aspect of the present disclosure.

In one aspect, a logical address space, also referred to as LZones is presented to the file system manager 134. As mentioned above, the LZones are mapped to RZones and defined by logical block addresses ("LBAs"). FIG. 1E shows an example of a LZone 141A that is visible to the file system manager 134. As an example, the LZone 141A is defined by a range of blocks, e.g., 1-60 that are visible or presented to the file system manager 134. Some of the blocks are free to be allocated, e.g., blocks numbered 1, 3, 4, 5, 9, 10, 22, 25, 26, 27, 28, 41, 42, 43, 46, 49, 52, 52, 57, 58, and 59 are free in this example. The remaining blocks are already written and hence are not free to be allocated. It is noteworthy that the FIG. 1E example of blocks 1-60 is simply to illustrate how the LZones are configured. The adaptive aspects of the present disclosure are not limited any specific size or specific number of blocks.

In one aspect, LZones across the plurality of ZNS SSDs form a write allocation area for the file system manager 134. To write data to each tetris of the LZone 141, the file system manager 134 issues tetris write requests in a sequential order 141B. The tetris write requests are labelled as 1-13 and sent by the file system manager 134 to write to the available blocks of LZones 141A.

As mentioned above, the zones in ZNS SSDs have to be written in a sequential manner, which presents a challenge for ZTL 138 because tetris write requests 1-13 may be received out of order at ZTL 138. To solve this technical problem, the file system manager 134 tags each tetris write request with a sequence number associated with a tetris. Each write request also includes a starting LBA and a skip mask that indicates to ZTL 138 the blocks that are already written. The ZTL 138 counter 139 tracks the sequence number of each received write request and ZTL 138 selects a tetris write request sequentially, based on the assigned sequence number.

Figure 1F:
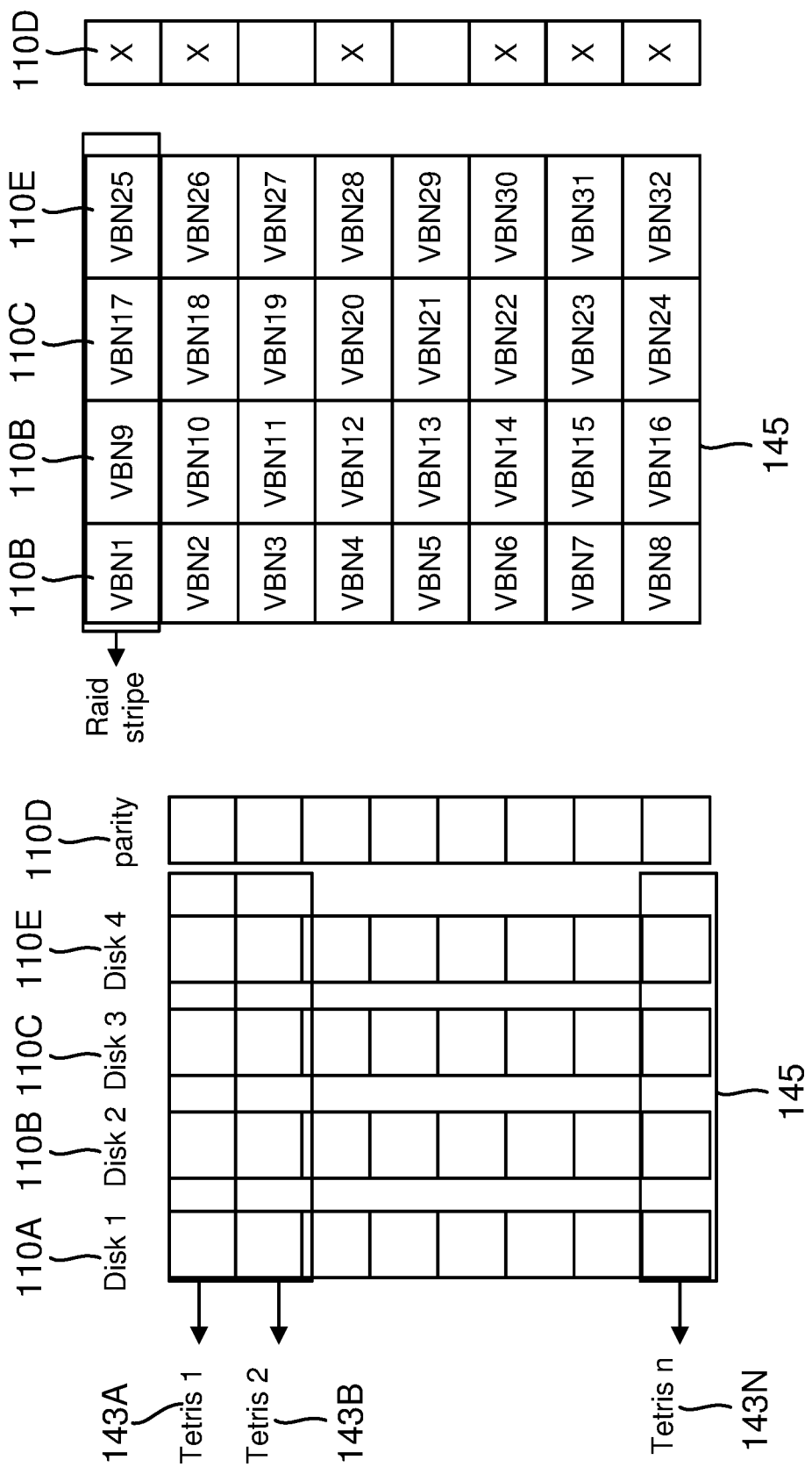
FIG. 1F shows an example of using one or more subdivision (also referred to as "tetris") in a RAID group having ZNS SSDs, according to one aspect of the present disclosure.

FIG. 1F shows an example of a RAID group 145 with ZNS SSDs 110A-110C and 110E and the parity drive 110D. The write allocation area of the RAID group 145 is divided into a plurality of subdivisions (or tetris), shown as tetris 143A-143N. Each tetris includes a collection of DBNs/VBNs (Volume Block Numbers) across the ZNS SSDs 110A-110E. Each tetris can be multiple pages deep, e.g., 64 blocks deep or any other configured size.

FIG. 1F also shows an example of free and "in-use" blocks within the RAID group 145. For example, ZNS SSD 110A has VBN 1, 6 and 7 free, ZNS SSD 110B has VBN 9, 12, 14 and 16 free, ZNS 110C has VBN 18, 22 and 23 free, while ZNS SSD 110E has VBN 28, 30, 31 and 32 free.

In one aspect, to write data across a tetris, a RAID process selects the tetris for a tetris write request and then data is written across the tetris, sequentially. To enable sequential writing, as mentioned above, the file system manager 134 tags a sequence number to each tetris write request, which indicates to ZTL 138 that the write requests are to be processed sequentially. Each tetris write request to ZTL 138 also includes a starting VBN and a skip mask indicating the VBNs that have already been written/consumed and should be skipped. The ZTL 138 uses the counter 139 to track the sequence numbers for each tetris write request corresponding to LZones across all the ZNS SSDs. The counter 139 is reset when the file system manager 134 switches to a different allocation area.

The following table illustrates the use of sequence numbers (SN-0 to SN-XXX) for processing write requests for two ZNS SSDs 110A/110B. Assume that the initial sequence number for a tetris write request starts with 0. An allocation area may have 256 tetris numbered T0-T255. A non-limiting, allocation area size for the example below may be 16 MB. The starting LBA can be 16384 for the allocation area and the values in parenthesis indicate the range of blocks that are consumed. (_____) in the table below indicates that no blocks are write allocated. The term "CP start" and "CP end" means a start and end of a consistency point to flush data to the ZNS SSDs from one or more memory buffers. Similar to the ZNS SSDs 110A-110B, the file system manager 134 also generates sequence numbers (e.g., SN-0 to SN-YYY) for the parity drive 110D.

|  | TETRIS# | ZNS SSD 110A (Serial # & Used Blocks) | ZNS SSD 110B (Serial # & Used Blocks) | PARITY DRIVE 110D |
|---|---|---|---|---|
| CP START | | | | |
| | T0 | (blks16384-16447) SN-0 | (blks16384-16447) SN-0 | SN-0 |
| | T1 | (blks164 48-16511) SN-1 | (blks16448-16511) SN-1 | SN-1 |
| | T2 | (blks16512-16514) SN-2 | (_____) | SN-2 |
| CP END | | | | |
| CP START | | | | |
| | T2 | (blks16515-16575) SN-3 | (blks16512-16575) SN-2 | SN-3 |
| | T3 | (blks16576-16639) SN-4 | blks16576-16639) SN-3 | SN-4 |
| | T4 | (blks16640-16645) SN-5 | (blks16640-16650) SN-4 | SN-5 |
| CP END | | | | |
| CP START | | | | |
| | T4 | (blks16646-16703) SN-6 | (blks166651-16703) SN-5 | SN6 |
| | T5 | (blks16704-16766) SN-7 | (_____) | SN7 |
| CP END | | | | |
| CP START | T5 | (blks16767-16768) SN-8 | (blks16704-16768) SN-6 | SN8 |
| | T255 | (_____) | (blks16704-xxxxxx) SN-XXX | |

In one aspect, ZNS SSDs have defined rules for writing to zones. For example, a zone should be "open: for writing and the writes are sequential with increasing block numbers of the zone. To enable multiple processors to write in parallel, the NVMe ZNS standard allows the ZNS SSDs to provide a Zone Random Write Area (ZRWA) for each available zone. The ZRWA is a buffer within a memory where writes to an open zone are gathered before being written to the PZones. ZRWA enables higher software layers (e.g., file system manager 134 and the TIER2 RAID layer 136) to issue write requests without the overhead of guaranteeing that the writes arrive in the sequential order at the ZNS SSD.

Figure 1G:
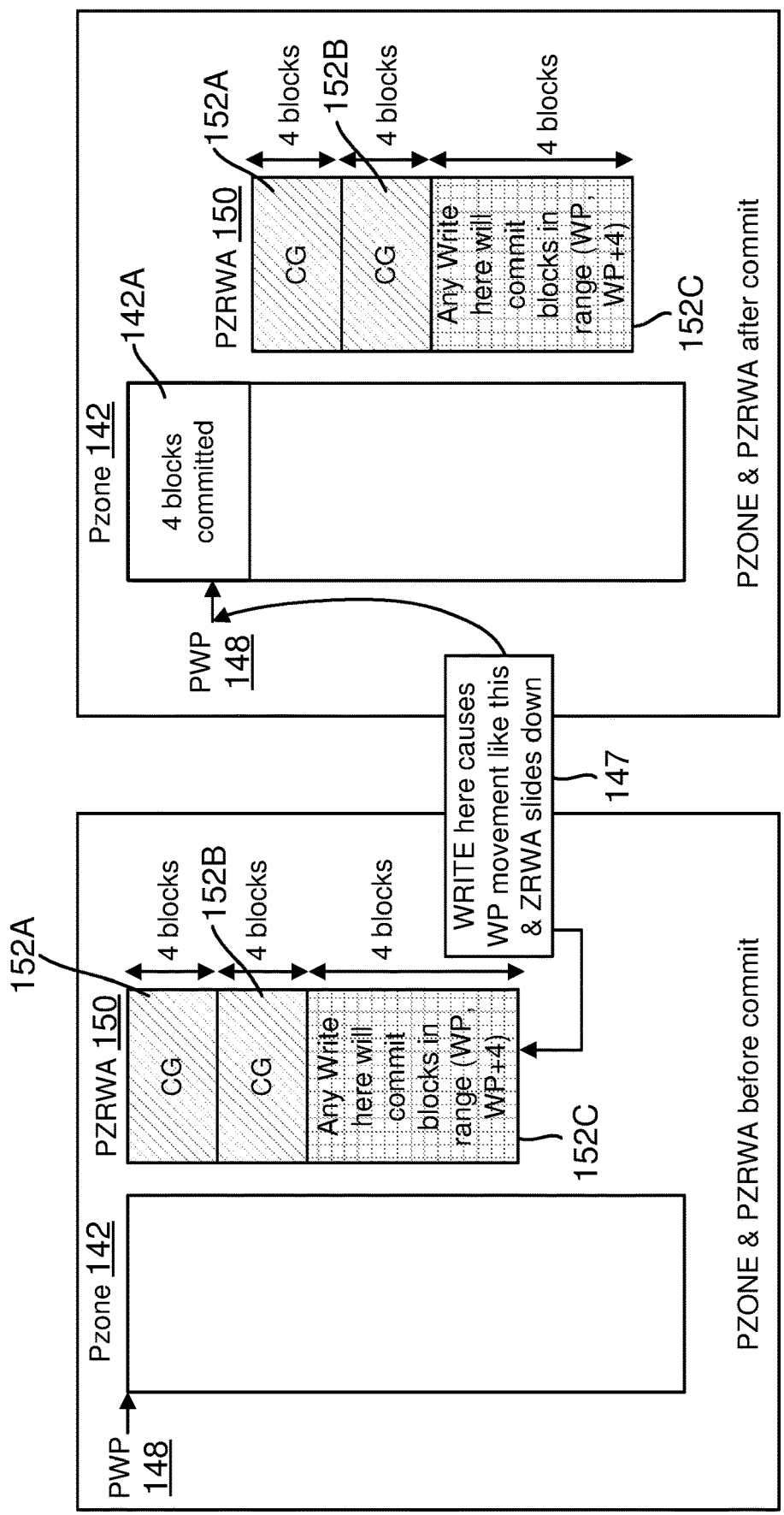
FIG. 1G shows an example of a "commit" operation for a physical zone (PZone) of a ZNS SSD.
Figure 1H:
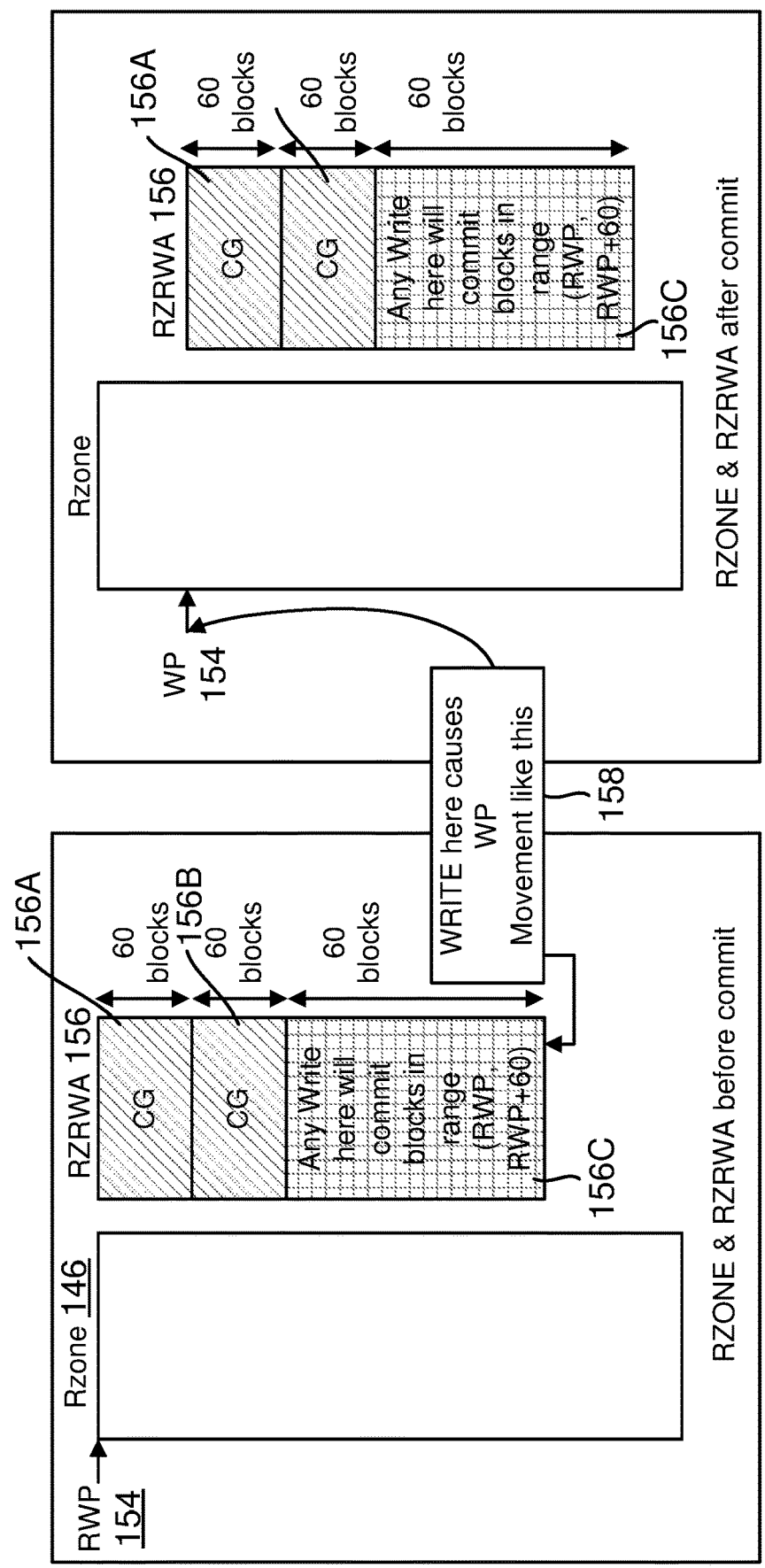
FIG. 1H shows an example of a "commit" operation for a RAID zone (RZone) of a ZNS SSD.

The data from the ZRWA is moved to the ZNS SSD zones via a "commit operation." An indication for the commit operation is provided by an upper layer software, e.g., the file system manager 134 and/or the TIER2 RAID layer 136. The commit operation may be explicit or implicit. An explicit commit operation happens when a commit command is sent to the ZNS SSD. An implicit operation commits data to a ZNS SSD zone, when the ZNS SSD receives a write command, which if executed would exceed the size of the ZRWA buffer (i.e., when the ZRWA buffer will reach a threshold value). An example of explicit and implicit commit operations is shown in FIGS. 1G and 1H, respectively, described below in detail.

Implicit Commit Operations: FIG. 1G shows an example of using an implicit commit operation in a PZone (e.g., 142) of a ZNS SSD to write data. Each PZone (e.g., 142) has a write pointer (WP) (shown as PWP 148). The location of PWP 148 shows a next writable block within the PZone 142. When a commit operation is executed, a certain number of data blocks (e.g., 152A/152B) from the beginning of the ZRWA (shown as PZRWA 150) are written at the WP 148 of the PZone and the WP 148 is incremented by the number of blocks written. The number of blocks thus written are termed as Commit Granularity (CG) of the PZone. CG is typically a property of the ZNS SSD, shown as an example, as 4 blocks. The size of the ZRWA 150 is a multiple of CG.

An implicit commit operation occurs when a software layer sends a write command (shown as 147) to the ZNS SSD beyond the ZRWA, shown as 152C. FIG. 1G shows that the PWP 148 has moved 4 blocks, after the 4 blocks have been committed (142A) i.e., transferred to the PZone 142.

As mentioned above and shown in FIG. 1H, Tier1 RAID layer 140 constructs virtual zones (i.e., RZones) by grouping together PZones across multiple MUs, which effectively creates an RZone (e.g., 146) with an associated ZRWA (shown as RZRWA) 156 and a RZone Write Pointer (shown as RWP) 154. The example of FIG. 1H assumes a MU count of 15, which makes the RZRWA size=15×8=120 blocks and the RCG=15×4=60 blocks (e.g., 156A/156B).

When a write operation (158) exceeds 120 blocks (shown as 156C), the data is committed from the virtual RZRWA 156 to the ZNS SSD. The RWP 154 then slides 60 blocks, as shown in FIG. 1F. In one aspect, PWP 148 tracks data from PZRWA 150 and RWP 154 track data movement between RZRWA 156 to RZone 146. This enables the TIER1 RAID layer to effectively manage data and parity writes.

Figure 1I:
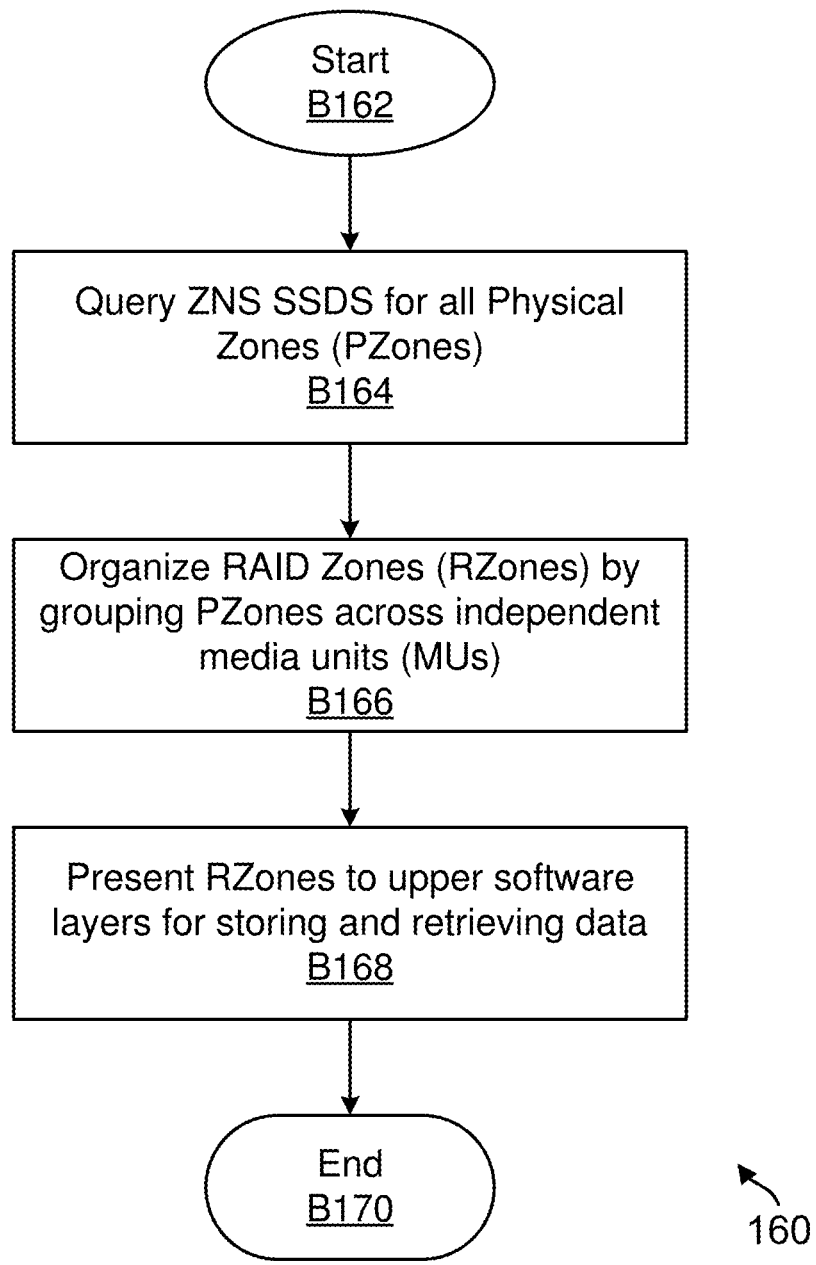
FIG. 1I shows a process for initializing PZones and RZones of a ZNS SSD, according to one aspect of the present disclosure.

Zone Initialization: FIG. 1I shows a process 160 for initializing the PZones and RZones by the TIER1 RAID layer 140, according to one aspect of the present disclosure. The process begins in block B162, before a ZNS SSD 110 is made available within the storage sub-system 112. In block B164, the TIER1 RAID layer 140 queries the ZNS SSDs for information regarding the PZones. Each storage device controller 102 executes firmware instructions out of a ZNS SSD memory. The storage device controller 102 provides information regarding the PZones, which includes a PZone address, size, starting offset value or any other information that can identify the PZone.

In block B166, the TIER1 RAID layer 140 groups PZones across independent MUs (e.g., 120A-120E, FIG. 1B) to create RZones, e.g., 142 (FIG. 1D). In one aspect, the MUs are grouped across RAID stripes of the ZNS SSDs. The various aspects of the present disclosure are not limited to any specific grouping of MUs. Thereafter, in block B168, the RZones are presented to upper layers, e.g., the TIER2 RAID layer 136. The TIER2 RAID layer 136 can then present RZones (e.g., 146A, 146B, FIG. 1D) to other layers, e.g., the file system manager 134. Based on the RZones, the file system manager 134 is presented with LZones that maps to the RZones. In other aspect, the file system manager 134 is presented the RZones to read and write data. The process then ends in block B170.

Figure 2A:
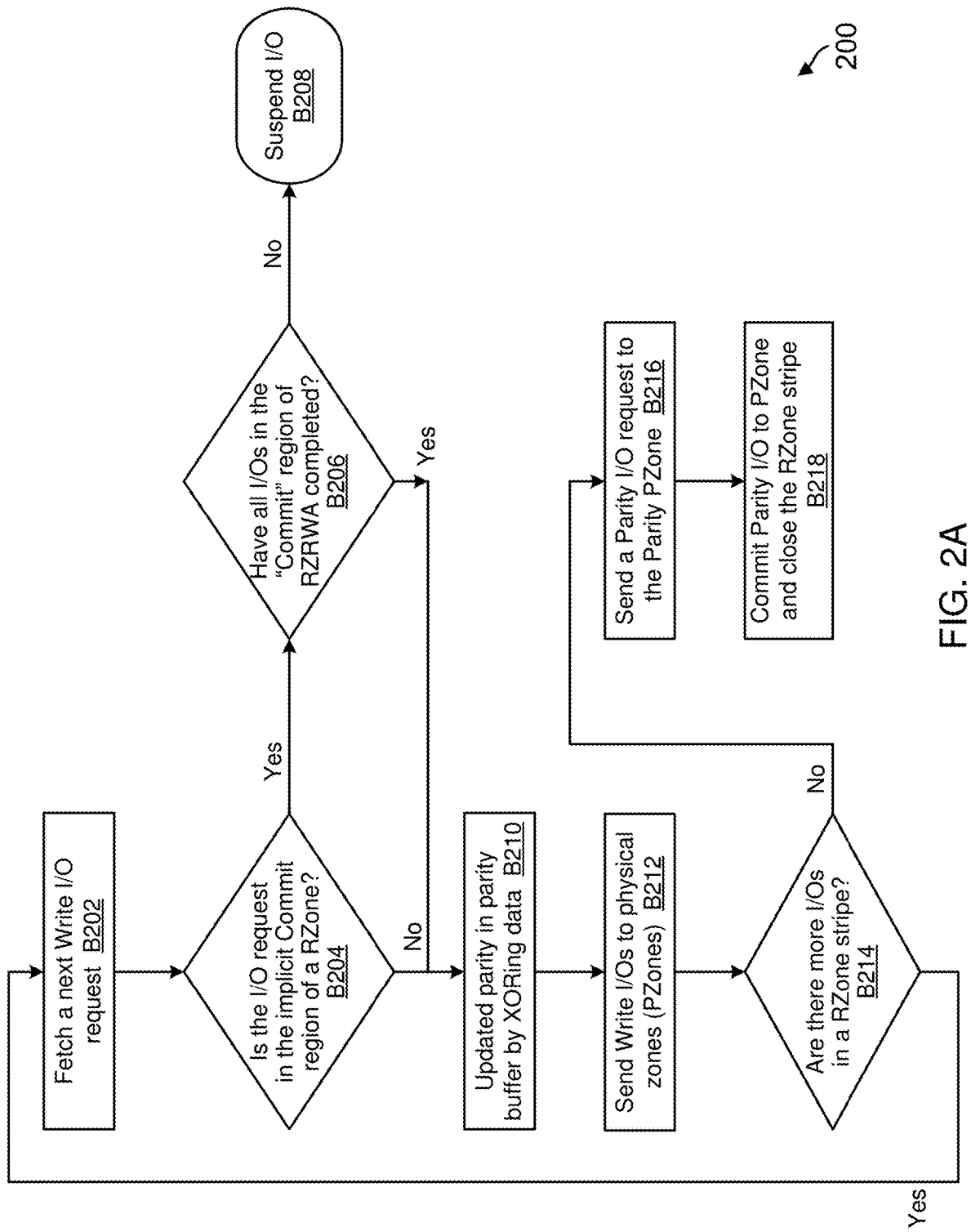
FIG. 2A shows a process for write request processing, according to one aspect of the present disclosure.
Figure 2B:
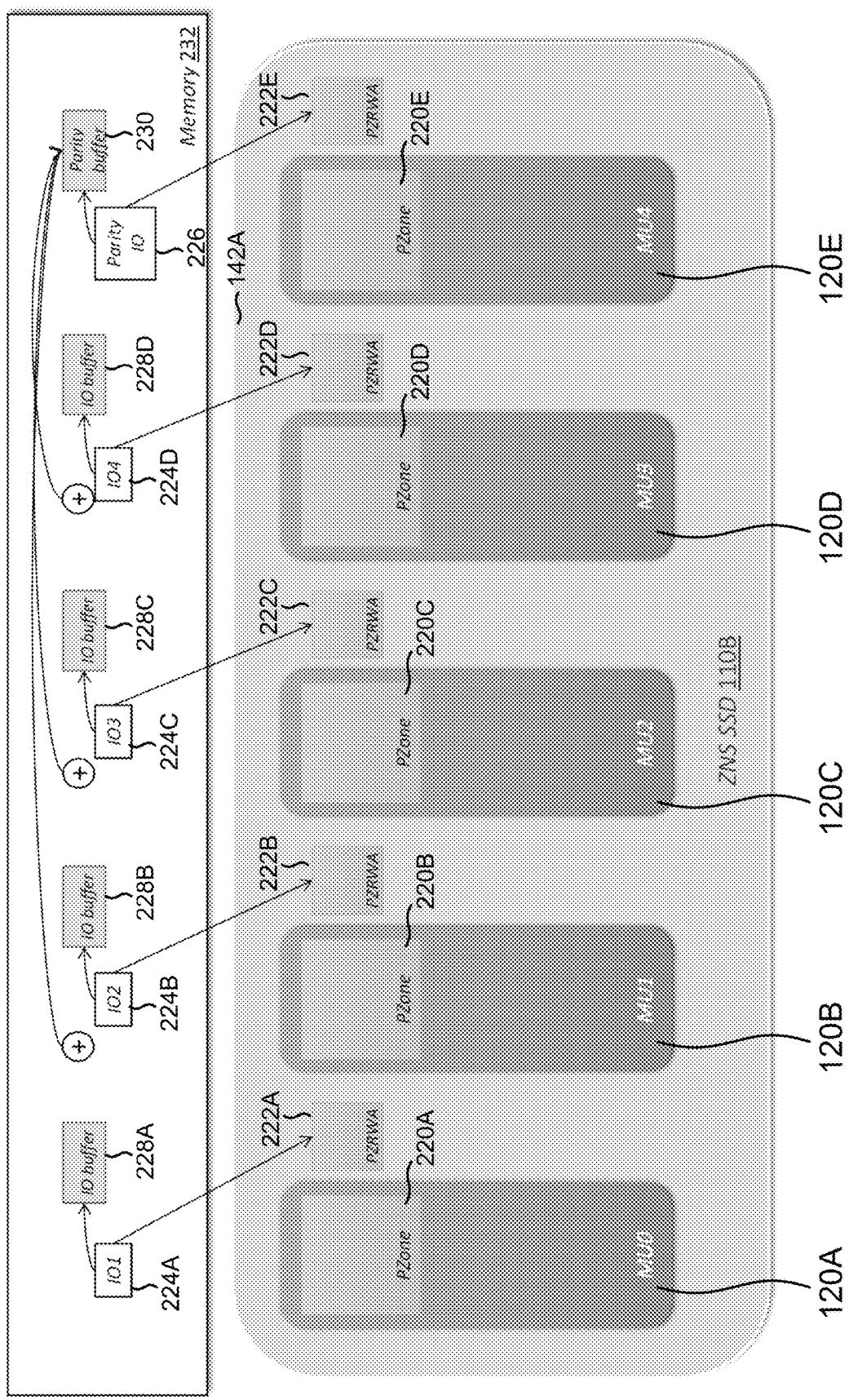
FIG. 2B illustrates the process of FIG. 2A, according to one aspect of the present disclosure.

Process Flows: FIGS. 2A and 2B illustrate overall write request processing and parity generation, according to one aspect of the present disclosure. FIG. 2B shows an example of a process 200 of FIG. 2A using the ZNS SSD 110B with independent MUs 120A-120E (FIG. 1B). As mentioned above, the upper layers (e.g., the file system manager 134 and the TIER2 RAID layer 136) only see RZones (e.g., 146A/146B, FIG. 1D) (or mapped LZones), hence all write I/Os that are received by the TIER1 RAID layer 140 target an RZone.

The TIER1 RAID layer 140 issues child I/Os 224A-224D to PZones based on a range of blocks that are targeted by the RZone I/O sent by an upper software layer (134 or 136). The I/Os 224A-224D are issued to write data that is temporarily stored at a plurality of I/O buffers 228A-228D in storage server memory 232. For example, data associated with I/O 224A is first written to PZRWA 222A assigned to the PZone 220A, before being committed to the PZone 220A; data for I/O 224B is written to PZRWA 222B assigned to the PZone 220B, before being committed to the PZone 220B; data for I/O 224C is written to the PZRWA 222C assigned to the PZone 220C, before being committed to the PZone 220C; and data for I/O 224D is written to the PZRWA 222D assigned to the PZone 220D, before being committed to the PZone 220D.

The TIER1 RAID layer 140 also computes parity blocks for the parity PZone 220E corresponding to the targeted RZone. The TIER1 RAID layer 140 issues a parity I/O 226 for computed parity stored at a parity buffer 230. The parity buffer 230 may be designated within the storage server memory 232 to store parity data. Parity data for I/O 226E is written to PZRWA 222E assigned to the PZone 220E, before being written to the PZone 220E. The parity data is computed by XORing the data in the I/O buffers 228A-228D. It is noteworthy that the parity buffer 230 is written to the parity PZone 220E and committed after all the blocks in a corresponding RZone stripe have been committed to the appropriate PZones (e.g., 220A-220D). The TIER1 RAID layer 140 assumes that if any RZone I/O targets a block beyond the RZRWAs (156, FIG. 1F)+RWP (154, FIG. 1H) then all the I/Os in the data PZones 220A-220D have been committed. Based on that assumption, the TIER1 RAID layer 140 can write and explicitly commit the parity in the parity buffer 230 to the parity PZone 226.

Referring now to FIG. 2A, process 200 begins after a write I/O request is issued by the TIER2 layer 136 (or file system manager 134). The write I/O provides one or more RZone identifier. The TIER1 layer 140 fetches the I/O request in block B202. In block B204, the TIER1 layer 140 evaluates the I/O request, determines the size of the data that needs to be written and ascertains the number of blocks that will be required for the I/O request. Based on that determination, the TIER1 RAID layer 140 determines if the I/O request falls within an implicit commit region of the RZone (156C, FIG. 1F). If yes, then in block B206, the TIER1 RAID layer 140 determines if all pending write I/Os for the commit region of the RZRWA 156 have been committed to the appropriate PZones. If not, the I/O is delayed in block B208, until the commit operation is completed.

If the fetched I/O request does not belong to the commit region or if the previous I/O requests for the commit region have been committed, the process moves to block B210, when the parity in parity buffer 230 is updated by XORing the data in the I/O buffers 228A-228D. The TIER1 RAID layer 140 generates child write I/O requests, e.g., 224A-224D, that are sent to the PZRWAs 222A-222D and committed to PZones 220A-220D. If there are more I/O requests for the RZone stripe, as determined in block B214, the process reverts back to block B202, otherwise, the TIER1 RAID layer 140 generates a parity I/O 226 that is sent to the PZRWA 222E and committed in block B218. This completes the write I/O request and parity generation by the TIER1 RAID layer 140.

Figure 2C:
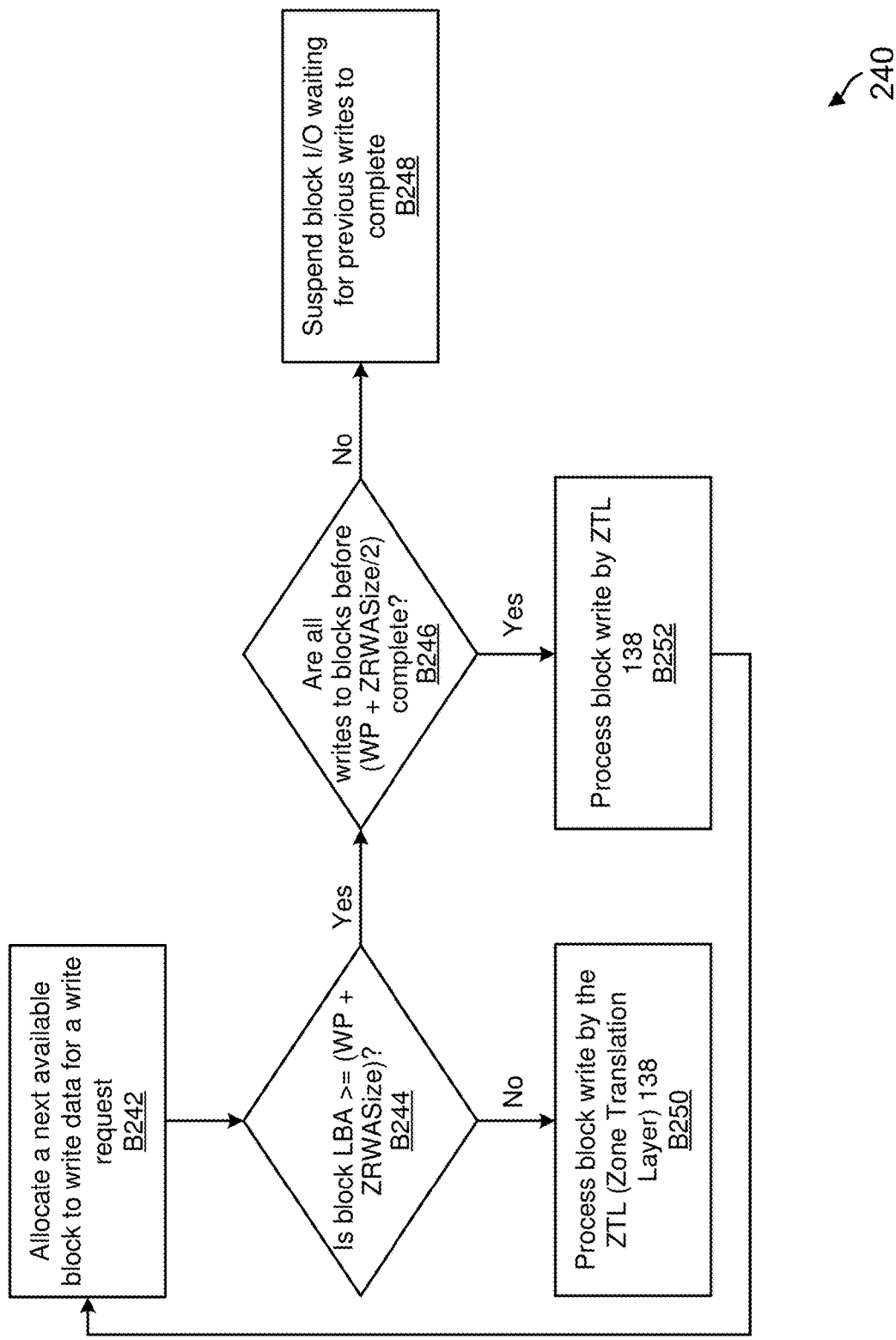
FIG. 2C shows another process for processing write requests, according to one aspect of the present disclosure.

FIG. 2C shows an overall process 240 for writing to a RZone, according to one aspect of the present disclosure. Process 240 begins when a write request has been received and in block B242, a next available block is allocated by the file system manager 134 for writing data for the write request. In block 244, the ZTL 138 determines if the block that needs to be written belongs to a certain range identified by the WP 154 (FIG. 1F) and the RZRWA 156 size. The ZTL 138 tracks the WP 154 and is aware of a last written block. If not, then in block B250, the write I/O is sent to the ZTL 138 and handled per the process of FIG. 2A. If yes, then ZTL 138 determines if all the previous blocks for previous one or more write requests, before WP+ZRWA size/2 have been written. If not, then the write I/O is held in block B248 until the previous write requests are complete. If yes, then in block B252, the write I/O is sent to the ZTL 138 and handled per the process of FIG. 2A.

Figure 2D:
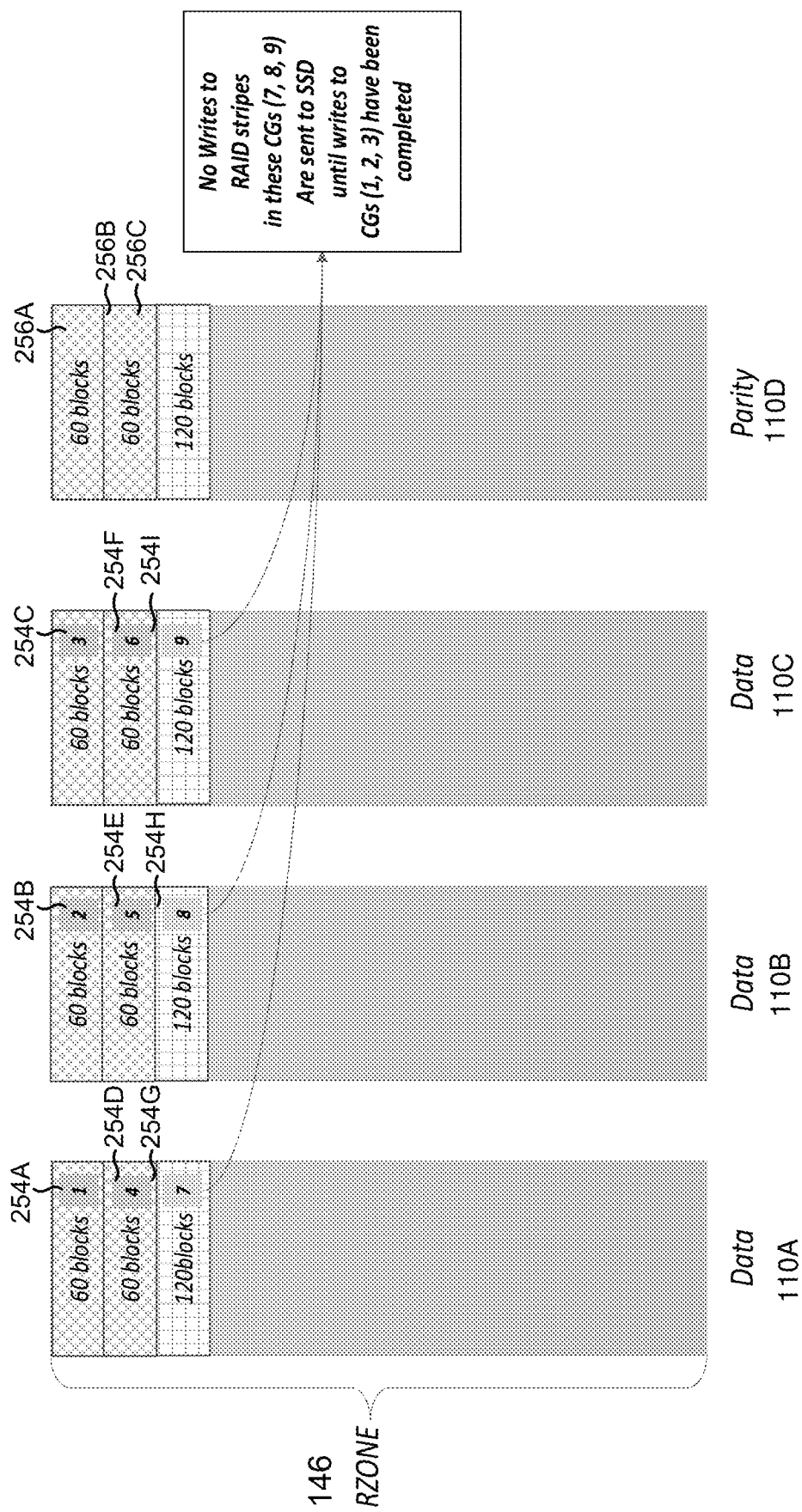
FIG. 2D illustrates the process of FIG. 2C, according to one aspect of the present disclosure.

An example, of process 240 is shown in FIG. 2D that illustrates the I/Os buffered in the storage server memory 232 to ensure that parity drive RZone blocks remain overwritable until a specific TIER2 RAID stripe has been written. FIG. 2D shows the ZNS SSDs 110A-110C with the parity drive 110D. No writes to RAID stripes within commit groups (CGs) 254G, 254H, and 254I with parity 256C are written to the ZNS SSDs until all the writes defined by CGs 254A-254F with parity at 256A/256B have been written. This ensures that all parity updates can be handled sequentially and reduces error risks for parity updates.

Figure 2E:
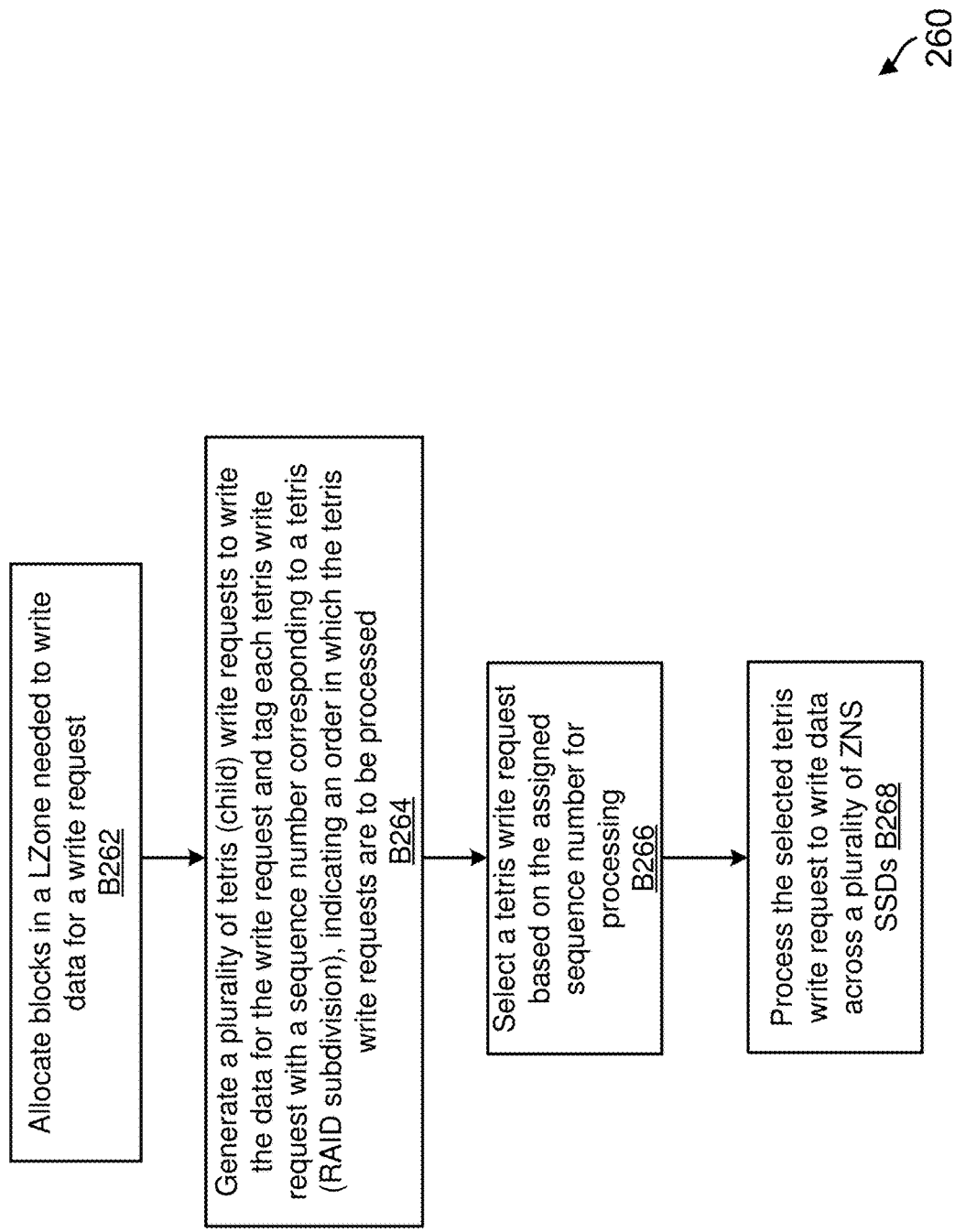
FIG. 2E shows a process using sequence numbers for executing a write operation, according to one aspect of the present disclosure.

FIG. 2E shows a process 260 for using a sequence number assigned by the file system manager 134 to process write requests by ZTL 138, according to one aspect of the present disclosure. Process 260 begins in block B262, when the file system manager 134 determines the number of blocks it may need for a write request to write data. The number of blocks will depend on the size of the data that has to be written for the write request. Based on that determination, the file system manager 134 allocates blocks within an LZone (e.g., 141A, FIG. 1E). As mentioned above, the LZone is mapped to one or more RZones (e.g., 146, FIG. 1D).

In block B264, based on the size of the data that has to be written, the file system manager 134 may issue or generate multiple tetris (or child) write requests, each write request corresponding to tetris (e.g., 143A-143N, FIG. 1F) within the LZone. The term tetris write request and child write request are used interchangeably throughout this application. The number of tetris write requests will depend on the overall size of the data that has to be written for the write request and the configured tetris size for each ZNS SSD. Each tetris write request includes the VBN(s)/DBN(s) within in a corresponding tetris and a skip mask indicating the blocks that are already written. The file system manager 134 also tags each tetris write request with a sequence number to indicate to ZTL 138 the order in which the tetris write requests are to be processed by the ZTL 138. The tetris write requests with the sequence number are provided to ZTL 138.

In block B266, the ZTL 138 selects a tetris write request for processing based on the sequence number. Thereafter, ZTL 138 also selects the corresponding tetris to process the tetris write request to write the data corresponding to the tetris write request. As mentioned above ZTL 138 maintains the counter 139 to track the sequence number tagged by the file system manager 134 and is aware of an expected sequence number based on the counter 139 value. For example, if ZTL 138 receives a tetris write request with sequence number 0, it knows it is the first write request. If it receives a tetris write request with the sequence number 3, then it knows that it is out of sequence because the expected tetris write request should have a sequence number of 1.

In block B268, the selected tetris write request is processed and data is written to the appropriate tetris (or subdivision) of the ZNS SSDs as described below with respect to FIG. 2G.

In one aspect, process 260 enables ZTL 138 to sequentially process tetris write requests using RZones without restricting I/O flow. This enables ZTL 138 to meet the NVMe standard for sequentially writing to ZNS SSD zones.

Figure 2F:
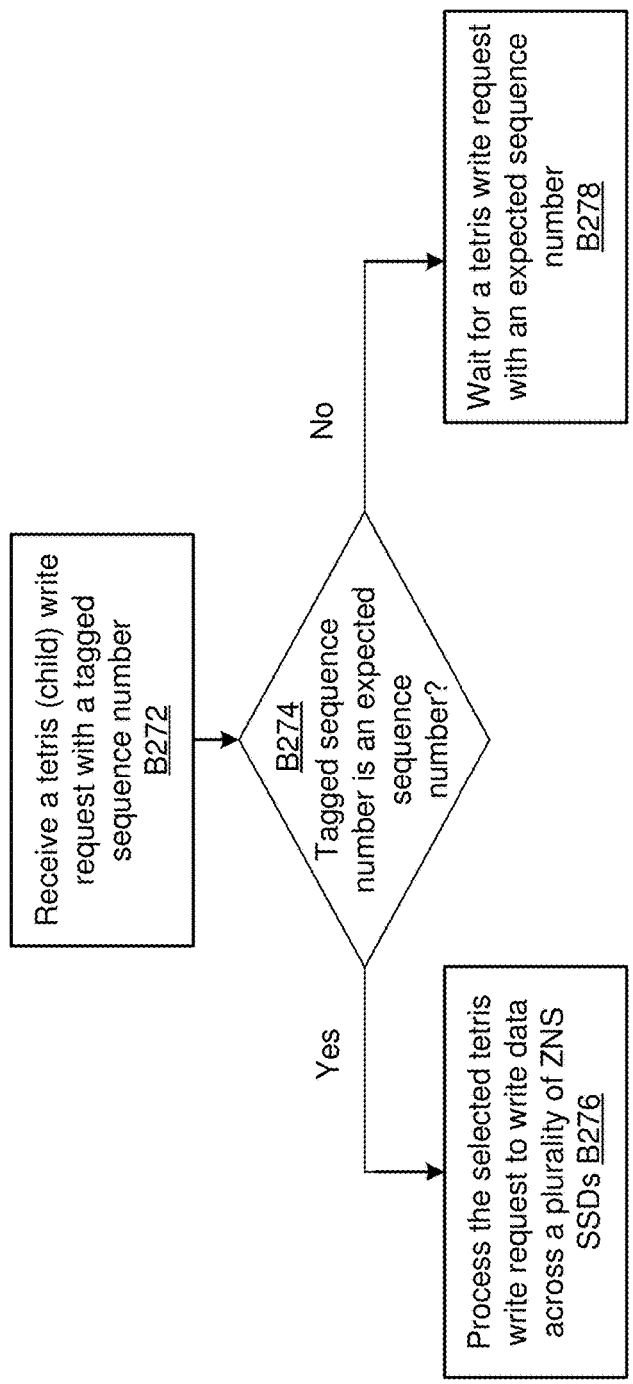
FIG. 2F shows another process using sequence numbers for executing a write operation, according to one aspect of the present disclosure.

FIG. 2F shows another process 270 for handling write requests, according to one aspect of the present disclosure. In block B272, the ZTL 138 receives a tetris write request from the file system manager 134 with a tagged sequence number, a starting LBA of a LZone (141A, FIG. 1E) and a skip mask indicating the blocks of the LZone that are already written.

In block B274, ZTL 138 determines (or detects) whether the tagged sequence number is an expected sequence number. As mentioned above, ZTL 138 maintains the counter 139 to track the sequence number of tetris write requests directed towards an allocation area comprising one or more LZones, where each LZone is mapped to one or more RZone.

If the sequence number is an expected sequence number, i.e., the sequence number is a next sequence number compared to a sequence number of a previously received tetris write request, the tetris write request is processed in block B276, as described below with respect to FIG. 2G. If the sequence number is out of order i.e., the received sequence is out of order, then in block B278, ZTL 138 waits to receive the tetris write request with the expected sequence number. In one aspect, ZTL 138 maintains a queue to temporarily store tetris write requests to sequentially process the tetris write requests received from the file system manager 134.

Figure 2G:
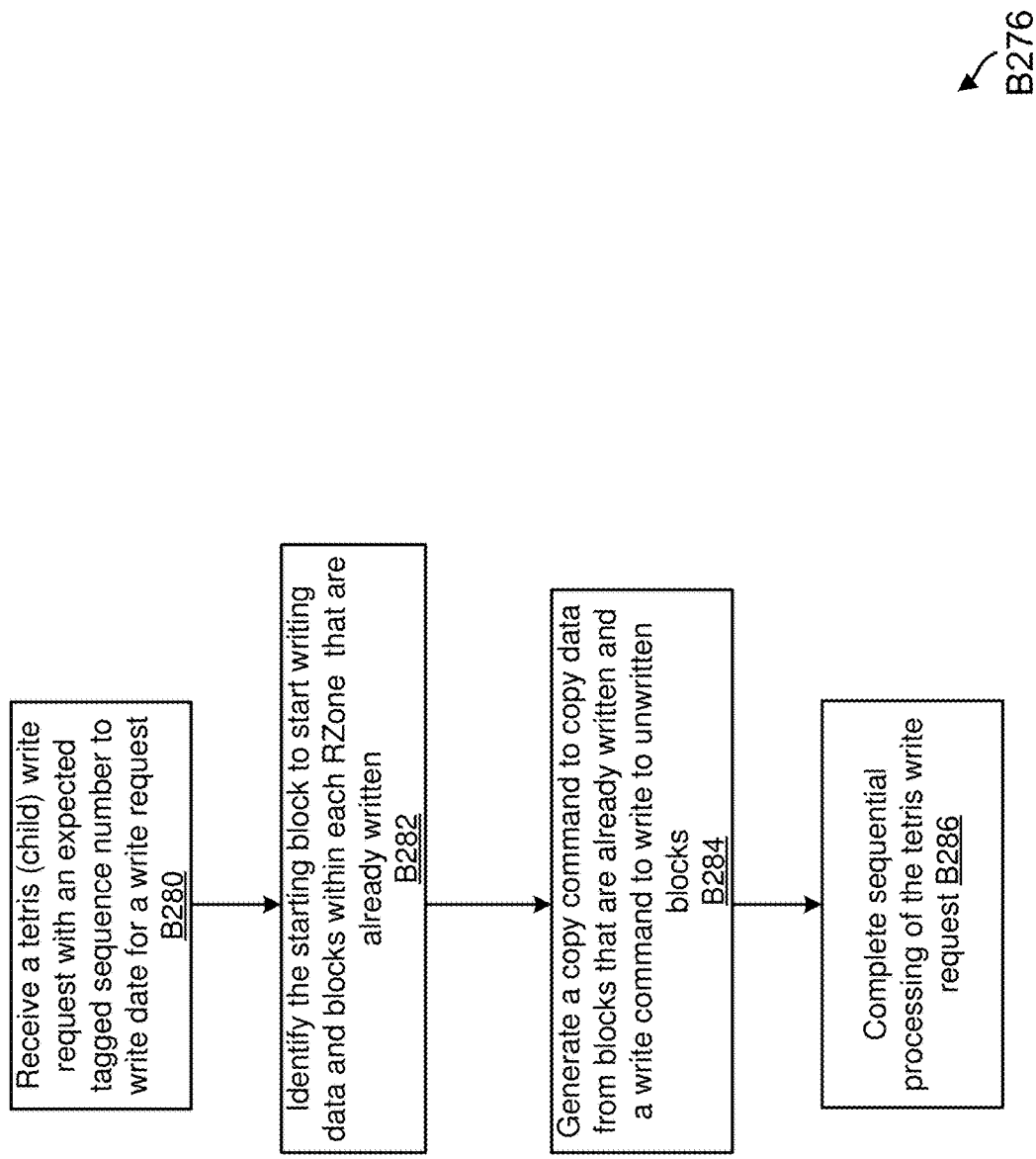
FIG. 2G shows details of processing a write request by a Zone Translation Layer ("ZTL") using sequence numbers, according to one aspect of the present disclosure.

FIG. 2G shows details of process block B276 of FIG. 2F (or block B268 of FIG. 2E), according to one aspect of the present disclosure. The process begins in block B280, after ZTL 138 receives a tetris write request with an expected tagged sequence number. In block B282, ZTL 138 identifies the starting block to write data as well as blocks that may already been written within each tetris (or each RZone) corresponding to the tetris write request. For example, as shown in FIG. 1F, ZTL 138 identifies VBN1 as the starting block for ZNS SSD 110A, while VBN2, VBN3, VBN4 and VBN5 and VBN8 have already been written. To maintain sequential writing, in block B284, based on a skip mask provided by the file system manager 134, ZTL 138 issues a copy command to copy the data that has already been written and a write command for the unwritten blocks. For example, with respect to FIG. 1F illustration, the copy command is used to copy data from VBN2, VBN3, VBN4, VBN5 and VBN, while the write command is used to write to VBN1, VBN6 and VBN7. Thereafter, in block B286, the sequential processing of the tetris write request is completed using the copy and the write command.

In one aspect, innovative technology for executing and implementing methods and systems for a storage environment are provided. One method includes generating (B264, FIG. 2E) a plurality of child (or tetris) write requests to write data for a write request using a plurality of subdivisions (e.g., tetris 143A-143N, FIG. 1F) of a plurality of LZones (e.g., 141A, FIG. 1E) defined for a plurality of ZNS SSDs (e.g., 110A-110C, FIG. 1B) of a RAID array, each LZone mapped to one or more RZone (e.g., 146A-146N, FIG. 1D) of the ZNS SSDs having a plurality of PZones (e.g., 142, FIG. 1D) across a plurality of independent media units of each ZNS SSD; assigning (B264, FIG. 2E) a sequence number to each child (or tetris) write request corresponding to each subdivision, the sequence number indicating an order in which the child (or tetris) write requests are to be processed; and selecting (e.g., B266, FIG. 2E), based on the assigned sequence number, one or more subdivisions for sequentially writing data to one or more RZones of the plurality of ZNS SSDs.

In another aspect, a non-transitory, machine-readable storage medium having stored thereon instructions for performing a method is provided. The machine executable code which when executed by at least one machine, causes the machine to: receive (e.g., B280, FIG. 2G), by a first processing layer (e.g., ZTL 138, FIG. 1D), a first child (or tetris) request from a plurality of child (or tetris) write requests corresponding to a write request to write data using a plurality of subdivisions of a plurality of LZones defined for a plurality of ZNS SSDs of a RAID array, each LZone mapped to one or more RZone of the ZNS SSDs, each RZone having a plurality of PZones across a plurality of independent media units of each ZNS SSD; detect (B282, FIG. 2G), by the first processing layer that a sequence number assigned to the first child write request by a second processing layer (e.g., file system manager 134, FIG. 1D) matches an expected sequence number; and process (e.g., B284, FIG. 2G), by the first processing layer, the first child request to sequentially write data across RZones corresponding to a subdivision specified by the first child request.

Figure 3:
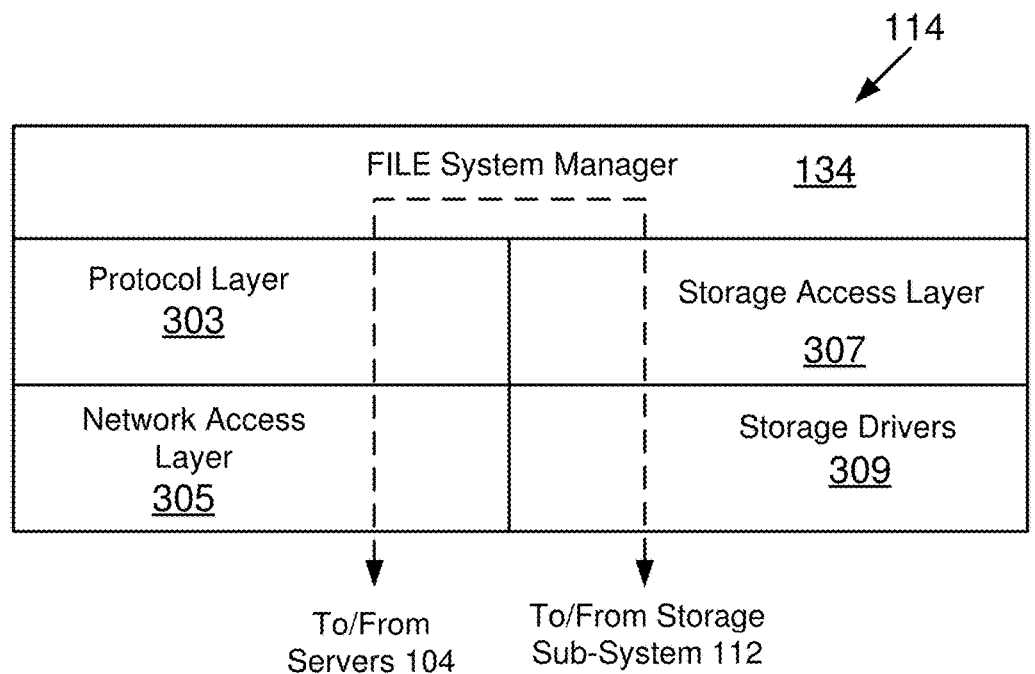
FIG. 3 shows an example of a storage operating system, used according to one aspect of the present disclosure.

Storage Operating System: FIG. 3 illustrates a generic example of operating system 114 executed by storage server 108, according to one aspect of the present disclosure. Storage operating system 114 interfaces with the storage sub-system 112 as described above in detail.

As an example, operating system 114 may include several modules, or "layers". These layers include a file system manager 134 that keeps track of a directory structure (hierarchy) of the data stored in storage devices and manages read/write operations, i.e., executes read/write operations on disks in response to server system 104 requests.

Operating system 114 may also include a protocol layer 303 and an associated network access layer 305, to allow storage server 108 to communicate over a network with other systems, such as server system 104, and management console 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and the storage sub-system 112 are illustrated schematically as a path, which illustrates the flow of data through operating system 114.

The operating system 114 may also include a storage access layer 307 and an associated storage driver layer 309 to communicate with a storage device. The storage access layer 307 may implement a higher-level disk storage protocol, such as TIER2 RAID layer 136, ZTL 138 and TIER1 RAID layer 140, while the storage driver layer 309 may implement a lower-level storage device access protocol, such as the NVMe protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage server 108.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
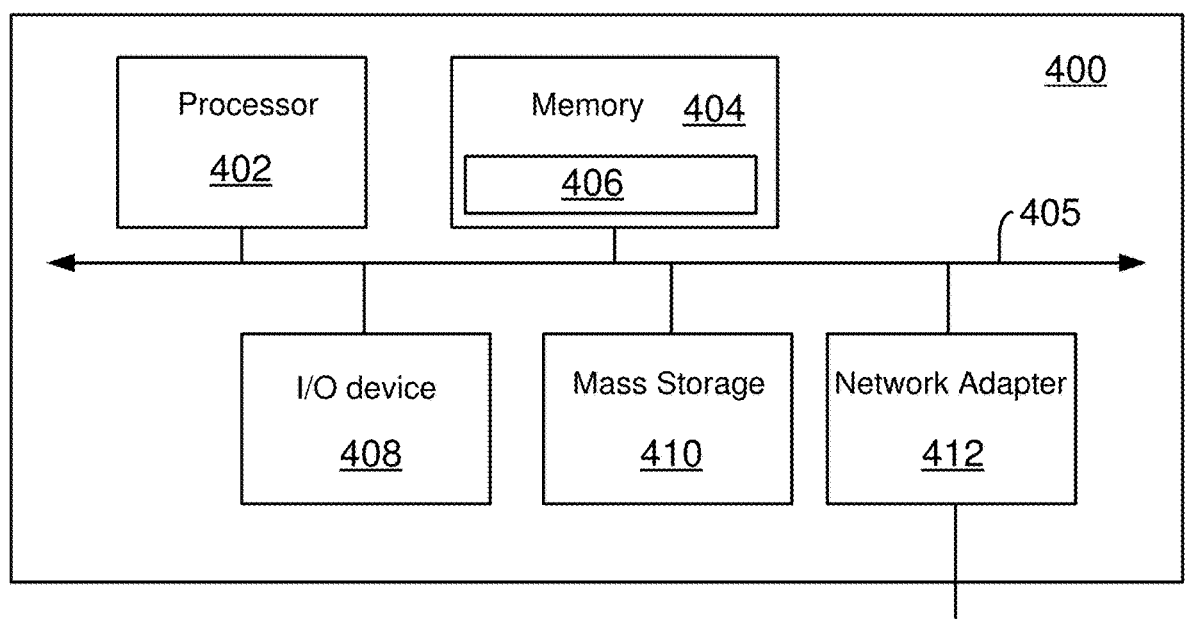
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent the storage server 108, the management console 118, server systems 104, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 1I, 2A, 2C and 2E-2G.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage at ZNS 110 is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above may be a part of the server layer for providing storage services. Details regarding these layers are not germane to the inventive aspects.

Thus, a method and apparatus for writing data using ZNS SSDs within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:

generating a plurality of child write requests to write data for a write request using a plurality of subdivisions of a plurality of logical zones (LZones) defined for a plurality of zoned namespace solid-state drives (ZNS SSDs) of a RAID (redundant array of independent disks) array, each LZone mapped to one or more logical RAID zone (RZone) of the ZNS SSDs, each RZone having a plurality of physical zones (PZones) across a plurality of independent media units of each ZNS SSD;

assigning a sequence number to each child write request corresponding to each subdivision, the sequence number indicating an order in which the child write requests are to be processed;

selecting, based on the assigned sequence number, one or more subdivisions for sequentially writing data to one or more RZones of the plurality of ZNS SSDs; and translating a logical block address (LBA) of a RZone specified by a child write request into a LBA of a PZone to write data for the child write request.

2. The method of claim 1, further comprising:
tracking the assigned sequence numbers to detect an out of order child write request; and
waiting to receive another child write request with an expected sequence number for sequential processing of the child write requests.

3. The method of claim 1, further comprising:
copying already stored data at a block of a selected subdivision to maintain sequential writing within the one or more RZones.

4. The method of claim 1, wherein a zone translation layer translates the LBA of the RZone into the LBA of the PZone to write data for the child request.

5. The method of claim 1, further comprising:
presenting, by a zone translation layer, the LZones to a file system that tags each child write request with the sequence number.

6. The method of claim 1, further comprising:
transferring data for the child write requests from a memory to a zone random write area (ZRWA) buffer corresponding to a PZone of each of the plurality of ZNS SSD; and
sequentially processing the child write requests to transfer the data from the ZRWA buffer to the corresponding PZone, when the ZRWA reaches a threshold.

7. The method of claim 1, further comprising:
resetting sequence number assignment, in response to a file system switching to a different allocation area with different LZones for writing data for a new write request.

8. A non-transitory, machine-readable storage medium having stored thereon instructions for performing a method, comprising machine executable code which when executed by at least one machine, causes the machine to:

receive, by a first processing layer, a first child request from a plurality of child write requests corresponding to a write request to write data using a plurality of subdivisions of a plurality of logical zones (LZones) defined for a plurality of zoned namespace solid-state drives (ZNS SSDs) of a RAID (redundant array of independent disks) array, each LZone mapped to one or more logical RAID zone (RZone) of the ZNS SSDs, each RZone having a plurality of physical zones (PZones) across a plurality of independent media units of each ZNS SSD;

detect, by the first processing layer that a sequence number assigned to the first child write request by a second processing layer matches an expected sequence number; and translate, by the first processing layer, a logical block address (LBA) of a RZone specified by the first child write request into a LBA of a PZone to store data;

process, by the first processing layer, the first child request to sequentially write data across RZones corresponding to a subdivision specified by the first child request.

9. The non-transitory, machine-readable storage medium of claim 8, wherein the machine executable code which when executed by at least one machine, further causes the machine to:
track, by the first processing layer, sequence numbers assigned by the second processing layer to detect an out of order child write request.

10. The non-transitory, machine-readable storage medium of claim 9, wherein the machine executable code which when executed by at least one machine, further causes the machine to:
delay processing the out of order child write request by waiting to receive a child write request with the expected sequence number.

11. The non-transitory, machine-readable storage medium of claim 8, wherein the machine executable code which when executed by at least one machine, further causes the machine to:
present, by the first processing layer, the LZones to the second processing layer that tags each child write request with a corresponding sequence number.

12. The non-transitory, machine-readable storage medium of claim 8, wherein the machine executable code which when executed by at least one machine, further causes the machine to:
reset, by the second processing layer, the sequence number, in response to switching to a different allocation area having different LZones for writing data for a new write request.

13. The non-transitory, machine-readable storage medium of claim 8, wherein the machine executable code which when executed by at least one machine, further causes the machine to:
transfer data for the child write requests from a memory to a zone random write area (ZRWA) buffer corresponding to a PZone of each of the plurality of ZNS SSD; and
sequentially process, by the first processing layer, the child write requests to transfer the data from the ZRWA buffer to the corresponding PZone, when the ZRWA reaches a threshold.

14. A system, comprising:
a memory containing machine readable medium comprising machine executable code having stored thereon instructions; and
a processor module of an offload engine coupled to the memory, the processor module configured to execute the machine executable code to:
generate a plurality of child write requests to write data for a write request using a plurality of subdivisions of a plurality of logical zones (LZones) defined for a plurality of zoned namespace solid-state drives (ZNS SSDs) of a RAID (redundant array of independent disks) array, each LZone mapped to one or more logical RAID zone (RZone) of the ZNS SSDs, each RZone having a plurality of physical zones (PZones) across a plurality of independent media units of each ZNS SSD;
assign a sequence number to each child write request corresponding to each subdivision, the sequence number indicating an order in which the child write requests are to be processed;
select, based on the assigned sequence number, one or more subdivisions for sequentially writing data to one or more RZones of the plurality of ZNS SSDs; and
translate a logical block address (LBA) of a RZone specified by a child write request into a LBA of a PZone to write data for the child write request.

15. The system of claim 14, wherein the machine executable code further causes to:
track the assigned sequence numbers to detect an out of order child write request; and wait to receive another child write request with an expected sequence number for sequential processing of the child write requests.

16. The system of claim 14, wherein the machine executable code further causes to:
copy already stored data at a block of a selected subdivision to maintain sequential writing within the one or more RZones.

17. The system of claim 14, wherein a zone translation layer translated the LBA of the RZone specified by the child write request into the LBA of the PZone.

18. The system of claim 14, wherein the machine executable code further causes to:
presenting, by a zone translation layer, the LZones to a file system that tags each child write request with the sequence number.

19. The system of claim 14, wherein the machine executable code further causes to:
transfer data for the child write requests from a memory to a zone random write area (ZRWA) buffer corresponding to a PZone of each of the plurality of ZNS SSD; and
sequentially process the child write requests to transfer the data from the ZRWA buffer to the corresponding PZone, when the ZRWA reaches a threshold.

20. The system of claim 14, wherein the machine executable code further causes to:
reset sequence number assignment, in response to a file system switching to a different allocation area with different LZones for writing data for a new write request.

* * * * *